United States Patent
Wu et al.

(10) Patent No.: US 10,785,010 B2
(45) Date of Patent: Sep. 22, 2020

(54) WIRELESS COMMUNICATIONS METHOD AND APPARATUS

(71) Applicant: Huawei Technologies Co., Ltd., Shenzhen (CN)

(72) Inventors: Zuomin Wu, Shenzhen (CN); Chaojun Li, Beijing (CN); Jiafeng Shao, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/402,987

(22) Filed: May 3, 2019

(65) Prior Publication Data

US 2019/0260559 A1 Aug. 22, 2019

Related U.S. Application Data

(63) Continuation of application No. PCT/CN2017/108597, filed on Oct. 31, 2017.

(30) Foreign Application Priority Data

Nov. 3, 2016 (CN) .......................... 2016 1 0959106

(51) Int. Cl.
*H04L 5/00* (2006.01)
*H04L 1/00* (2006.01)
(Continued)

(52) U.S. Cl.
CPC .......... *H04L 5/0082* (2013.01); *H04L 1/0003* (2013.01); *H04L 1/1812* (2013.01);
(Continued)

(58) Field of Classification Search
CPC ... H04L 1/1812; H04L 1/0003; H04L 1/1874; H04L 5/0082; H04L 1/1835; H04W 72/04; H04W 28/18
See application file for complete search history.

(56) References Cited

U.S. PATENT DOCUMENTS 9,148,818 B2 * 9/2015 Yue .......................... H04L 5/001
2013/0250924 A1 9/2013 Chen et al.
(Continued)

FOREIGN PATENT DOCUMENTS

CN 104094661 A 10/2014
CN 104205708 A 12/2014
(Continued)

OTHER PUBLICATIONS

3GPP TS 36.331 V14.0.0 (Sep. 2016);3rd Generation Partnership Project;Technicai Specification Group Radio Access Network;Evolved Universal Terrestrial Radio Access (E-UTRA);Radio Resource Control (RRC);Protocol specification (Release 14);total 644 pages.
(Continued)

*Primary Examiner* — Asad M Nawaz
*Assistant Examiner* — Syed Ali
(74) *Attorney, Agent, or Firm* — Leydig, Voit & Mayer, Ltd.

(57) ABSTRACT

A wireless communication method is provided. The method includes: determining, by a terminal device, a first coefficient, where the first coefficient belongs to a first coefficient set corresponding to a first transmission time interval TTI, the first coefficient set includes N coefficients, N≥2, and the N coefficients include at least two coefficients used for uplink transmission in the first TTI, or at least two coefficients used for downlink transmission in the first TTI; determining, by the terminal device, a first transport block size TBS based on the first coefficient; and performing, by the terminal device, wireless communication based on the first TBS in the first TTI. Reliability and accuracy of wireless communication can be improved.

8 Claims, 9 Drawing Sheets

(51) Int. Cl.
*H04L 1/18* (2006.01)
*H04W 28/18* (2009.01)
*H04W 72/04* (2009.01)

(52) U.S. Cl.
CPC .......... *H04L 1/1835* (2013.01); *H04L 1/1874* (2013.01); *H04W 28/18* (2013.01); *H04W 72/04* (2013.01); *H04L 1/1819* (2013.01)

(56) References Cited

U.S. PATENT DOCUMENTS

| | | | |
|---|---|---|---|
| 2014/0086285 A1* | 3/2014 | Yang | H04B 7/0691 |
| | | | 375/219 |
| 2014/0355540 A1 | 12/2014 | Accongiagioco et al. | |
| 2015/0063280 A1 | 3/2015 | Nan et al. | |
| 2016/0204907 A1 | 7/2016 | Chen et al. | |
| 2017/0164384 A1* | 6/2017 | Wang | H04L 5/0044 |
| 2017/0366311 A1* | 12/2017 | Iyer | H04L 5/0007 |
| 2018/0048441 A1* | 2/2018 | Bagheri | H04W 72/0446 |
| 2018/0049197 A1* | 2/2018 | Patel | H04L 5/0053 |
| 2018/0097600 A1 | 4/2018 | Bagheri | H04W 72/082 |
| 2018/0241500 A1* | 8/2018 | Takeda | H04L 1/0009 |
| 2019/0230659 A1* | 7/2019 | Sahlin | H04W 72/14 |

FOREIGN PATENT DOCUMENTS

| | | |
|---|---|---|
| EP | 3288207 A1 | 2/2018 |
| KR | 20160083050 A | 7/2016 |
| WO | 2013166719 A1 | 11/2013 |
| WO | 2016064808 A1 | 4/2016 |
| WO | 2017165198 A1 | 9/2017 |

OTHER PUBLICATIONS

3GPP TS 36.212 V14.0.0 (Sep. 2016);3rd Generation Partnership Project;Technical Specification Group Radio Access Network;Evolved Universal Terrestrial Radio Access (E-UTRA);Multiplexing and channel coding(Release 14);total 148 pages.

3GPP TS 36.211 V14.0.0 (Sep. 2016);3rd Generation Partnership Project;Technical Specification Group Radio Access Network;Evolved Universal Terrestrial Radio Access (E-UTRA);Physical channels and modulation(Release 14);total 170 pages.

3GPP TS 36.213 V14.0.0 (Sep. 2016);3rd Generation Partnership Project;Technical Specification Group Radio Access Network;Evolved Universal Terrestrial Radio Access (E-UTRA);Physical layer procedures(Release 14);total 406 pages.

Ericsson,"sPDCCH search space design",3GPP TSG-RAN WG1 #85 R1-165293,Nanjing, P.R. China, May 23-27, 2016,total 6 pages.

"Uplink H-ARQ timing and number of processes," 3GPP TSG RAN WG1 Meeting #44, Denver, USA, R1-060404, pp. 1-4, 3rd Generation Partnership Project, Valbonne, France (Feb. 13-17, 2006).

* cited by examiner

WIRELESS COMMUNICATIONS METHOD AND APPARATUS

CROSS-REFERENCE TO RELATED APPLICATIONSL

This application is a continuation of International Application No. PCT/CN2017/108597, filed one Oct. 31, 2017, which claims priority to Chinese Patent Application No. 201610959106.3, filed on Nov. 3, 2016, The disclosures of the aforementioned applications are hereby incorporated by reference in their entireties.

TECHNICAL FIELD

Embodiments of this application relate to the communications field, and more specifically, to a wireless communications method and apparatus.

BACKGROUND

Currently, in a known wireless communications technology, if a data packet is transmitted in a TTI of 1 ms, after a network device determines a time-frequency resource used to transmit data (or a time-frequency resource scheduled by the network device for or allocated by the network device to a terminal device), such as one or more resource blocks (RB), the network device usually selects, based on a channel status of the terminal device and from a plurality of TBS values that are included in a transport block size (TBS) table and that correspond to the time-frequency resource, a TBS meeting a transmission requirement of the terminal device, and notifies the terminal device of a modulation and coding scheme (MCS) index corresponding to the TBS and information about the time-frequency resource. The terminal device determines, based on the MCS index and the information about the time-frequency resource, a TBS of the data packet transmitted in the TTI.

If a data packet is transmitted in a TTI less than 1 ms, because an existing TBS table matches a 1 ms TTI length that is based on a specific overhead assumption, after a network device determines a time-frequency resource used to transmit data, the network device usually quantizes the time-frequency resource based on a preset quantization coefficient (for example, any value between 0 and 1). The network device selects, based on a channel status of a terminal device and from a plurality of TBS values that are included in the TBS table and that correspond to the quantized time-frequency resource, a TBS meeting a transmission requirement of the terminal device, and notifies the terminal device of an MCS index corresponding to the TBS and information about the time-frequency resource. The terminal device quantizes the time-frequency resource using the same quantization coefficient and a same quantization rule to obtain the quantized time-frequency resource, and determines, based on the MCS index and the quantized time-frequency resource, a TBS of the data packet transmitted in the TTI less than 1 ms. Moreover, in the current system, one TTI length corresponds to only one fixed quantization coefficient.

In the current system, the foregoing method for determining a TBS in a TTI less than 1 ms is usually applied to a special subframe in a TDD system. Although overheads required by communication such as reference signal or control channel transmission may degrade reliability and accuracy of communication in which this TBS determining method is used, because the special subframe appears only in the TDD system and appears a maximum of twice in a 10 ms radio frame, system performance is not significantly affected.

With development of a communications technology, a short transmission time interval (sTTI), to be specific, a transmission time interval (TTI) whose length is less than one subframe (or 1 ms), is introduced into a system, to shorten a scheduling interval, meet a low-delay service requirement, and improve use experience of a user. However, in sTTI transmission, overheads required by communication such as reference signal or control channel transmission exert non-negligible impact on TBS determining, use of the foregoing method for determining a TBS in a TTI less than 1 ms affects communication reliability, accuracy, and flexibility, thereby affecting use experience of a user and system performance.

SUMMARY

Embodiments of the present invention provide a wireless communications method and apparatus, to improve reliability and accuracy of wireless communication.

According to a first aspect, a wireless communication method is provided. The method includes: determining, by a terminal device, a first coefficient, where the first coefficient belongs to a first coefficient set corresponding to a first transmission time interval TTI, the first coefficient set includes N coefficients, N≥2, and the N coefficients include at least two coefficients used for uplink transmission in the first TTI, or at least two coefficients used for downlink transmission in the first TTI; determining, by the terminal device, a first transport block size TBS based on the first coefficient; and performing, by the terminal device, wireless communication based on the first TBS in the first TTI.

Two or more coefficients used to determine a TBS are configured for one TTI, so that a proper coefficient can be selected based on current use of the TTI to determine the TBS, and the determined TBS can correspond to a current communication status, thereby improving reliability and accuracy of wireless communication.

With reference to the first aspect, in a first implementation of the first aspect, the N coefficients correspond to K overhead ranges, K≥1, each overhead range corresponds to at least one coefficient, there is at least one different coefficient in coefficients corresponding to any two overhead ranges, the first coefficient is a coefficient corresponding to a first overhead range, the first overhead range is an overhead range to which overheads of a first time-frequency resource belong, and the first time-frequency resource is a time-frequency resource used by the terminal device in the first TTI.

With reference to the first aspect and the foregoing implementation of the first aspect, in a second implementation of the first aspect, there are N overhead ranges (in other words, K=N), and the N coefficients are in a one-to-one correspondence with the N overhead ranges.

With reference to the first aspect and the foregoing implementations of the first aspect, in a third implementation of the first aspect, the overheads of the first time-frequency resource include at least one of the following parameters: a quantity of resource elements REs in the first time-frequency resource that are occupied by control information, a quantity of resource blocks RBs in the first time-frequency resource that are occupied by the control information, a quantity of control channel elements CCEs in the first time-frequency resource that are occupied by the control information, a quantity of REs in the first time-frequency resource that are occupied by a reference signal, and a quantity of symbols in the first time-frequency resource that are occupied by the reference signal.

With reference to the first aspect and the foregoing implementations of the first aspect, in a fourth implementation of the first aspect, when the first TTI is used for downlink transmission, the overheads of the first time-frequency resource include at least one of the following cases: the overheads of the first time-frequency resource include a quantity or proportion of resources in the first time-frequency resource that are occupied by a cell-specific reference signal CRS; the overheads of the first time-frequency resource include a quantity or proportion of resources in the first time-frequency resource that are occupied by a terminal device-specific reference signal DMRS; or the overheads of the first time-frequency resource include a quantity or proportion of resources in the first time-frequency resource that are occupied by a downlink control channel.

Coefficients used to determine a TBS are separately configured for different overhead ranges, so that the coefficients can adapt to different overhead cases, and the determined TBS meets a current overhead case of the TTI, thereby further improving the reliability and the accuracy of wireless communication.

With reference to the first aspect and the foregoing implementations of the first aspect, in a fifth implementation of the first aspect, when the first TTI is used for uplink transmission, the overheads of the first time-frequency resource include at least one of the following cases: the overheads of the first time-frequency resource include a quantity or proportion of resources in the first time-frequency resource that are occupied by uplink control information; or the overheads of the first time-frequency resource include a quantity or proportion of resources in the first time-frequency resource that are occupied by an uplink reference signal.

Coefficients used to determine a TBS are separately configured for different overhead ranges, so that the coefficients can adapt to different overhead cases, and the determined TBS meets a current overhead case of the TTI, thereby further improving the reliability and the accuracy of wireless communication.

With reference to the first aspect and the foregoing implementations of the first aspect, in a sixth implementation of the first aspect, the N coefficients correspond to M modulation and coding scheme MCS sets, $M \geq 1$, each MCS set includes at least one MCS, each MCS set corresponds to at least one coefficient, there is at least one different coefficient in coefficients corresponding to any two MCS sets, the first coefficient is a coefficient corresponding to a first MCS set, and the first MCS set is an MCS set to which an MCS used by the terminal device in the first TTI belongs.

With reference to the first aspect and the foregoing implementations of the first aspect, in a seventh implementation of the first aspect, there are N MCS sets (in other words, M=N), and the N MCS sets are in a one-to-one correspondence with the N overhead ranges.

Coefficients used to determine a TBS are separately configured for different MCS sets, so that the coefficients can adapt to use of different MCSs, thereby ensuring system coverage, increasing a system peak rate, and/or improving the reliability and the accuracy of wireless communication.

With reference to the first aspect and the foregoing implementations of the first aspect, in an eighth implementation of the first aspect, the N coefficients correspond to P frequency domain resource quantity ranges, $P \geq 1$, each frequency domain resource quantity range corresponds to at least one coefficient, there is at least one different coefficient in coefficients corresponding to any two frequency domain resource quantity ranges, the first coefficient is a coefficient corresponding to a first frequency domain resource quantity range, the first frequency domain resource quantity range is a frequency domain resource quantity range to which a frequency domain resource quantity corresponding to the first time-frequency resource belongs, and the first time-frequency resource is the time-frequency resource used by the terminal device in the first TTI.

With reference to the first aspect and the foregoing implementations of the first aspect, in a ninth implementation of the first aspect, there are N frequency domain resource quantity ranges (in other words, P=N), and the N frequency domain resource quantity ranges are in a one-to-one correspondence with the N overhead ranges.

With reference to the first aspect and the foregoing implementations of the first aspect, in a tenth implementation of the first aspect, the frequency domain resource quantity range includes an RB quantity range, and the frequency domain resource quantity includes an RB quantity.

Coefficients used to determine a TBS are separately configured for different frequency domain resource quantity ranges, so that the coefficients can adapt to use of different frequency domain resource quantities, and the determined TBS meets a use requirement of a current frequency domain resource quantity in the TTI, thereby further improving the reliability and the accuracy of wireless communication.

With reference to the first aspect and the foregoing implementations of the first aspect, in an eleventh implementation of the first aspect, the N coefficients correspond to Q TBS sets, $Q \geq 1$, each TBS set includes at least one TBS, each TBS set corresponds to at least one coefficient, there is at least one different coefficient in coefficients corresponding to any two TBS sets, the first coefficient is a coefficient corresponding to a first TBS set, and the first TBS set is a TBS set to which a TBS used by the terminal device in the first TTI belongs.

With reference to the first aspect and the foregoing implementations of the first aspect, in a twelfth implementation of the first aspect, there are N TBS sets (in other words, Q=N), and the N TBS sets are in a one-to-one correspondence with the N overhead ranges.

Different coefficients are separately configured for different TBS sets, so that more relatively small TBSs can be obtained through quantization based on the different coefficients, and the determined TBS meets transmission requirements of different services.

With reference to the first aspect and the foregoing implementations of the first aspect, in a thirteenth implementation of the first aspect, the determining, by a terminal device, a first coefficient includes: receiving, by the terminal device, first indication information sent by a network device, where the first indication information indicates the first coefficient.

The terminal device determines the first coefficient based on an indication of the network device, so that workload of the terminal device can be reduced.

With reference to the first aspect and the foregoing implementations of the first aspect, in a fourteenth implementation of the first aspect, the determining, by a terminal device, a first coefficient includes: determining, by the terminal device, the first coefficient from the first coefficient set based on the first TTI.

The terminal device independently determines the first coefficient, so that overheads used to transmit, between the network device and the terminal device, signaling indicating the first coefficient can be reduced.

With reference to the first aspect and the foregoing implementations of the first aspect, in a fifteenth implementation of the first aspect, the method further includes: receiving, by the terminal device, second indication information sent by the network device, where the second indication information indicates the first coefficient set.

The terminal device determines the first coefficient set based on an indication of the network device, so that workload of the terminal device can be reduced.

With reference to the first aspect and the foregoing implementations of the first aspect, in a sixteenth implementation of the first aspect, the N coefficients included in the first coefficient set are determined based on a quantity of symbols included in the first TTI or a TTI structure of a subframe to which the first TTI belongs.

With reference to the first aspect and the foregoing implementations of the first aspect, in a seventeenth implementation of the first aspect, the first coefficient set is a coefficient set shared by a plurality of TTIs including the first TTI, and the plurality of TTIs include different quantities of symbols, or subframes to which the plurality of TTIs belong have different TTI structures.

With reference to the first aspect and the foregoing implementations of the first aspect, in an eighteenth implementation of the first aspect, the first coefficient set is a coefficient set specific to the first TTI.

With reference to the first aspect and the foregoing implementations of the first aspect, in a nineteenth implementation of the first aspect, the method further includes: determining, by the terminal device, a second coefficient, where the second coefficient is a unique coefficient corresponding to a second TTI, and a length of the second TTI is greater than a length of the first TTI; determining, by the terminal device, a second TBS based on the second coefficient; and performing, by the terminal device, wireless communication based on the second TBS in the second TTI.

According to a second aspect, a wireless communication method is provided. The method includes: determining, by a network device, a first coefficient, where the first coefficient belongs to a first coefficient set corresponding to a first transmission time interval TTI, the first coefficient set includes N coefficients, N≥2, and the N coefficients include at least two coefficients used for uplink transmission in the first TTI, or at least two coefficients used for downlink transmission in the first TTI; determining, by the network device, a first transport block size TBS based on the first coefficient; and performing, by the network device, wireless communication with a terminal device based on the first TBS in the first TTI.

Two or more coefficients used to determine a TBS are configured for one TTI, so that a proper coefficient can be selected based on current use of the TTI to determine the TBS, and the determined TBS can correspond to a current communication status, thereby improving reliability and accuracy of wireless communication.

With reference to the second aspect, in a first implementation of the second aspect, the N coefficients correspond to K overhead ranges, K≥1, each overhead range corresponds to at least one coefficient, there is at least one different coefficient in coefficients corresponding to any two overhead ranges, the first coefficient is a coefficient corresponding to a first overhead range, the first overhead range is an overhead range to which overheads of a first time-frequency resource belong, and the first time-frequency resource is a time-frequency resource used by the terminal device in the first TTI.

With reference to the second aspect and the foregoing implementation of the second aspect, in a second implementation of the second aspect, there are N overhead ranges (in other words, K=N), and the N coefficients are in a one-to-one correspondence with the N overhead ranges.

With reference to the second aspect and the foregoing implementations of the second aspect, in a third implementation of the second aspect, the overheads of the first time-frequency resource include at least one of the following parameters: a quantity of resource elements REs in the first time-frequency resource that are occupied by control information, a quantity of resource blocks RBs in the first time-frequency resource that are occupied by the control information, a quantity of control channel elements CCEs in the first time-frequency resource that are occupied by the control information, a quantity of REs in the first time-frequency resource that are occupied by a reference signal, and a quantity of symbols in the first time-frequency resource that are occupied by the reference signal.

With reference to the second aspect and the foregoing implementations of the second aspect, in a fourth implementation of the second aspect, when the first TTI is used for downlink transmission, the overheads of the first time-frequency resource include at least one of the following cases: the overheads of the first time-frequency resource include a quantity or proportion of resources in the first time-frequency resource that are occupied by a cell-specific reference signal CRS; the overheads of the first time-frequency resource include a quantity or proportion of resources in the first time-frequency resource that are occupied by a terminal device-specific reference signal DMRS; or the overheads of the first time-frequency resource include a quantity or proportion of resources in the first time-frequency resource that are occupied by a downlink control channel.

Coefficients used to determine a TBS are separately configured for different overhead ranges, so that the coefficients can adapt to different overhead cases, and the determined TBS meets a current overhead case of the TTI, thereby further improving the reliability and the accuracy of wireless communication.

With reference to the second aspect and the foregoing implementations of the second aspect, in a fifth implementation of the second aspect, when the first TTI is used for uplink transmission, the overheads of the first time-frequency resource include at least one of the following cases: the overheads of the first time-frequency resource include a quantity or proportion of resources in the first time-frequency resource that are occupied by uplink control information; or the overheads of the first time-frequency resource include a quantity or proportion of resources in the first time-frequency resource that are occupied by an uplink reference signal.

Coefficients used to determine a TBS are separately configured for different overhead ranges, so that the coefficients can adapt to different overhead cases, and the determined TBS meets a current overhead case of the TTI, thereby further improving the reliability and the accuracy of wireless communication.

With reference to the second aspect and the foregoing implementations of the second aspect, in a sixth implementation of the second aspect, the N coefficients correspond to M modulation and coding scheme MCS sets, M≥1, each MCS set includes at least one MCS, each MCS set corresponds to at least one coefficient, there is at least one different coefficient in coefficients corresponding to any two MCS sets, the first coefficient is a coefficient corresponding to a first MCS set, and the first MCS set is an MCS set to which an MCS used by the terminal device in the first TTI belongs.

With reference to the second aspect and the foregoing implementations of the second aspect, in a seventh implementation of the second aspect, there are N MCS sets (in other words, M=N), and the N MCS sets are in a one-to-one correspondence with the N overhead ranges.

Coefficients used to determine a TBS are separately configured for different MCS sets, so that the coefficients can adapt to use of different MCSs, thereby ensuring system coverage, increasing a system peak rate, and/or improving the reliability and the accuracy of wireless communication.

With reference to the second aspect and the foregoing implementations of the second aspect, in an eighth implementation of the second aspect, the N coefficients correspond to P frequency domain resource quantity ranges, $P \geq 1$, each frequency domain resource quantity range corresponds to at least one coefficient, there is at least one different coefficient in coefficients corresponding to any two frequency domain resource quantity ranges, the first coefficient is a coefficient corresponding to a first frequency domain resource quantity range, the first frequency domain resource quantity range is a frequency domain resource quantity range to which a frequency domain resource quantity corresponding to the first time-frequency resource belongs, and the first time-frequency resource is the time-frequency resource used by the terminal device in the first TTI.

With reference to the second aspect and the foregoing implementations of the second aspect, in a ninth implementation of the second aspect, there are N frequency domain resource quantity ranges (in other words, P=N), and the N frequency domain resource quantity ranges are in a one-to-one correspondence with the N overhead ranges.

With reference to the second aspect and the foregoing implementations of the second aspect, in a tenth implementation of the second aspect, the frequency domain resource quantity range includes an RB quantity range, and the frequency domain resource quantity includes an RB quantity.

Coefficients used to determine a TBS are separately configured for different frequency domain resource quantity ranges, so that the coefficients can adapt to use of different frequency domain resource quantities, and the determined TBS meets a use requirement of a current frequency domain resource quantity in the TTI, thereby further improving the reliability and the accuracy of wireless communication.

With reference to the second aspect and the foregoing implementations of the second aspect, in an eleventh implementation of the second aspect, the N coefficients correspond to Q TBS sets, $Q \geq 1$, each TBS set includes at least one TBS, each TBS set corresponds to at least one coefficient, there is at least one different coefficient in coefficients corresponding to any two TBS sets, the first coefficient is a coefficient corresponding to a first TBS set, and the first TBS set is a TBS set to which a TBS used by the terminal device in the first TTI belongs.

With reference to the second aspect and the foregoing implementations of the second aspect, in a twelfth implementation of the second aspect, there are N TBS sets (in other words, Q=N), and the N TBS sets are in a one-to-one correspondence with the N overhead ranges.

Different coefficients are separately configured for different TBS sets, so that more relatively small TBSs can be obtained through quantization based on the different coefficients, and the determined TBS meets transmission requirements of different services.

With reference to the second aspect and the foregoing implementations of the second aspect, in a thirteenth implementation of the second aspect, the determining, by a network device, a first coefficient includes: determining, by the network device, the first coefficient set; and determining, by the network device, the first coefficient from the first coefficient set based on the first TTI.

With reference to the second aspect and the foregoing implementations of the second aspect, in a fourteenth implementation of the second aspect, the method further includes: sending, by the network device, first indication information to the terminal device, where the first indication information indicates the first coefficient.

The network device can flexibly select, as the first coefficient, a coefficient meeting a current use requirement of the TTI, thereby further improving the reliability and the accuracy of wireless communication.

With reference to the second aspect and the foregoing implementations of the second aspect, in a fifteenth implementation of the second aspect, the method further includes: sending, by the network device, second indication information to the terminal device, where the second indication information indicates the first coefficient set.

With reference to the second aspect and the foregoing implementations of the second aspect, in a sixteenth implementation of the second aspect, the N coefficients included in the first coefficient set are determined based on a quantity of symbols included in the first TTI or a TTI structure of a subframe to which the first TTI belongs.

With reference to the second aspect and the foregoing implementations of the second aspect, in a seventeenth implementation of the second aspect, the first coefficient set is a coefficient set shared by a plurality of TTIs including the first TTI, and the plurality of TTIs include different quantities of symbols, or subframes to which the plurality of TTIs belong have different TTI structures.

With reference to the second aspect and the foregoing implementations of the second aspect, in an eighteenth implementation of the second aspect, the first coefficient set is a coefficient set specific to the first TTI.

With reference to the second aspect and the foregoing implementations of the second aspect, in a nineteenth implementation of the second aspect, the method further includes: determining, by the network device, a second coefficient, where the second coefficient is a unique coefficient corresponding to a second TTI, and a length of the second TTI is greater than a length of the first TTI; determining, by the network device, a second TBS based on the second coefficient; and performing, by the network device, wireless communication with the terminal device based on the second TBS in the second TTI.

According to a third aspect, a wireless communications apparatus is provided, configured to perform the method in the first aspect and any possible implementation of the first aspect, or configured to perform the method in the second aspect and any possible implementation of the second aspect. Specifically, the wireless communications apparatus may include a unit configured to perform the method in the first aspect and any possible implementation of the first aspect, or a unit configured to perform the method in the second aspect and any possible implementation of the second aspect.

According to a fourth aspect, a wireless communications device is provided, including a memory and a processor. The memory is configured to store a computer program, and the processor is configured to invoke the computer program from the memory and run the computer program, so that the wireless communications device performs the method in the first aspect and any possible implementation of the first aspect, or performs the method in the second aspect and any possible implementation of the second aspect.

According to a fifth aspect, a computer program product is provided. The computer program product includes computer program code, and when the computer program code is run by a receiving unit, a processing unit, and a sending unit, or by a receiver, a processor, and a transmitter of a communications device (for example, a network device or a terminal device), the communications device performs the method in the first aspect and any possible implementation of the first aspect, or performs the method in the second aspect and any possible implementation of the second aspect.

According to a sixth aspect, a computer-readable storage medium is provided. The computer-readable storage medium stores a program, and the program enables a communications device (for example, a network device or a terminal device) to perform the method in the first aspect and any possible implementation of the first aspect, or perform the method in the second aspect and any possible implementation of the second aspect.

DESCRIPTION OF EMBODIMENTS

Figure 1:
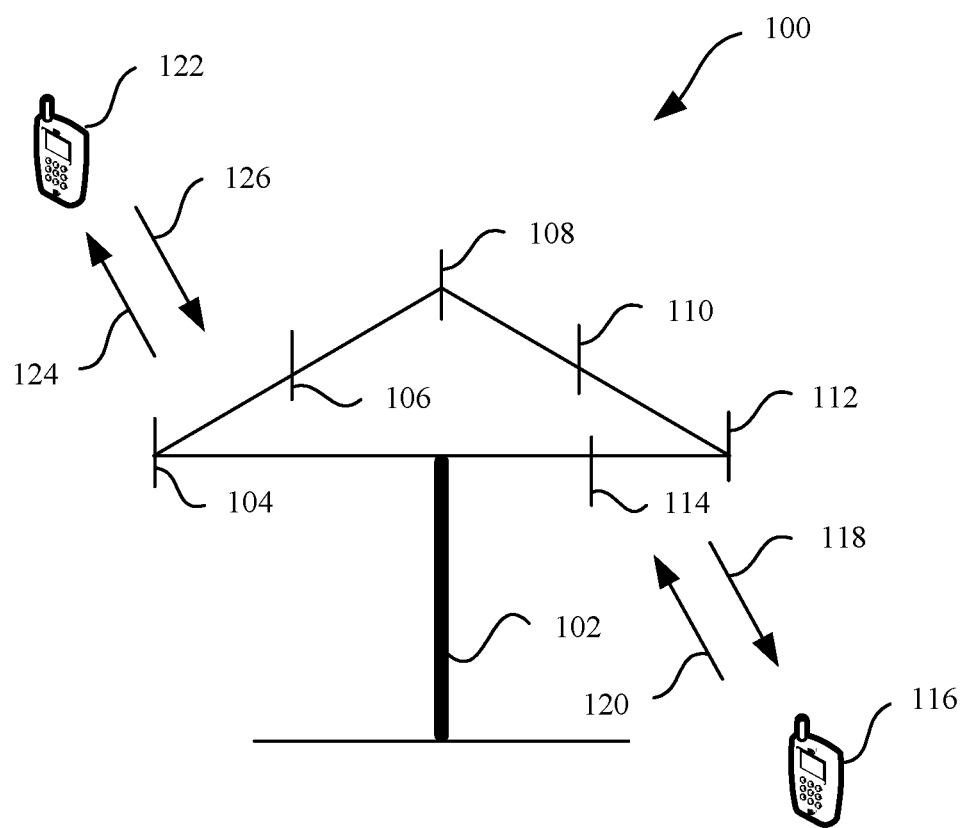
FIG. 1 is a schematic architectural diagram of a communications system to which a wireless communications method and apparatus according to embodiments of the present invention are applied.

The following describes technical solutions in this application with reference to the accompanying drawings.

Terms such as "component", "module", and "system" used in this specification are used to indicate computer-related entities, hardware, firmware, combinations of hardware and software, software, or software being executed. For example, the component may be, but is not limited to, a process that runs on a processor, a processor, an object, an executable file, a thread of execution, a program, and/or a computer. As shown in figures, both an application that runs on a computing device and the computing device may be components. One or more components may reside within a process and/or a thread of execution, and may be located on one computer and/or distributed on two or more computers. In addition, these components may be executed from various computer-readable media that store various data structures. The components may communicate based on, for example, a signal having one or more data packets (for example, data from two components interacting with another component in a local system, in a distributed system, and/or across a network such as the Internet interacting with another system using a signal) using a local and/or remote process.

It should be understood that, technical solutions in embodiments of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, a Universal Mobile Telecommunications System (UMTS), or a next-generation communications system.

Usually, a conventional communications system supports a limited quantity of connections, and is easy to implement. However, with evolution of a communications technology, in addition to conventional communication, a mobile communications system further supports, for example, device-to-device (D2D) communication, machine-to-machine (M2M) communication, machine type communication (MTC), and vehicle-to-vehicle (V2V) communication.

Various embodiments are described in the embodiments of the present invention with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (STA) in a wireless local area network (WLAN), or may be a cellular phone, a cordless telephone set, a Session Initiation Protocol (SIP) phone, a wireless local loop (WLL) station, a personal digital assistant (PDA) device, a handheld device having a wireless communication function, a computing device or another processing device connected to a wireless modem, an in-vehicle device, a wearable device, a terminal device in a next-generation communications system such as a 5th generation (5G) communications network, or a terminal device in a future evolved public land mobile network (PLMN).

By way of example instead of limitation, in the embodiments of the present invention, the terminal device may alternatively be a wearable device. The wearable device may also be referred to as a wearable smart device, and is a general term for devices such as glasses, gloves, watches, clothing, or shoes that can be worn and that are developed by intelligently designing everyday wearing by applying a wearable technology. The wearable device is a portable device that is directly worn on the body or that is integrated into user's clothing or accessories. The wearable device is more than a hardware device, and implements powerful functions through software support, data exchange, and cloud interaction. General wearable smart devices include a full-functioned and large-size device that can implement all or some functions without a smartphone, such as a smartwatch or smart glasses; and a device that focuses on only one specific type of application functions and needs to be used together with another device such as a smartphone, such as various smart bands for vital sign monitoring or smart jewelry.

In addition, various embodiments are described in the embodiments of the present invention with reference to a network device. The network device may be a device used to communicate with a mobile device. The network device may be an access point (AP) in a WLAN or a base transceiver station (BTS) in GSM or CDMA, or may be a NodeB (NB) in WCDMA, or may be an evolved NodeB (eNB or eNodeB) in LTE, a relay station, an access point, an in-vehicle device, a wearable device, a network device in a future 5G network, or a network device in a future evolved PLMN.

In addition, in the embodiments of the present invention, the terminal device may perform wireless communication in a cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by a small coverage area and low transmit power, and are suitable to provide a high-rate data transmission service.

In addition, a plurality of cells may simultaneously work on a carrier in an LTE system at a same frequency. In some special scenarios, it may be considered that a carrier and a cell in the LTE system are equivalent in concept. For example, in a carrier aggregation (CA) scenario, when a secondary component carrier is configured for UE, both a carrier index of the secondary component carrier and a cell identifier (Cell ID) of a secondary serving cell that works on the secondary component carrier are carried. In this case, it may be considered that the carrier and the cell are equivalent in concept. For example, access to a carrier by the UE is equivalent to access to a cell by the UE.

A method and an apparatus that are provided in the embodiments of the present invention may be applied to the terminal device or the network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more computer operating systems that implement service processing using a process, such as a Linux operating system, a Unix operating system, an Android operating system, an iOS operating system, or a Windows operating system. The application layer includes applications such as a browser, an address book, word processing software, and instant messaging software. Moreover, in the embodiments of the present invention, a specific structure of an entity for performing a wireless communication method is not particularly limited in the embodiments of the present invention, provided that the entity can run a program recording code of the wireless communication method in the embodiments of the present invention, to perform communication using the wireless communication method in the embodiments of the present invention. For example, the wireless communication method in the embodiments of the present invention may be performed by the terminal device, the network device, or a functional module that is in the terminal device or the network device and that can invoke and execute the program.

In addition, various aspects or features of the embodiments of the present invention may be implemented as a method, an apparatus, or a product that uses standard programming and/or engineering technologies. The term "product" used in this application covers a computer program that can be accessed from any computer-readable device, carrier, or medium. For example, the computer-readable medium may include, but is not limited to, a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read-only memory (EPROM), a card, a stick, or a key drive). In addition, various storage media described in this specification may represent one or more devices and/or another machine-readable medium used for storing information. The term "machine-readable medium" may include, but is not limited to, a radio channel and various other media that can store, contain, and/or carry an instruction and/or data.

FIG. 1 is a schematic diagram of a wireless communications system to which the embodiments of the present invention are applied. As shown in FIG. 1, a communications system 100 includes a network device 102. The network device 102 may include one or more antennas, for example, antennas 104, 106, 108, 110, 112, and 114. In addition, the network device 102 may additionally include a transmitter chain and a receiver chain. A person of ordinary skill in the art may understand that, the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices similar to the terminal device 116 or 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antennas 112 and 114. The antennas 112 and 114 send information to the terminal device 116 over a forward link (also referred to as a downlink) 118, and receive information from the terminal device 116 over a reverse link (also referred to as an uplink) 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 and the reverse link 120 may use different bands, and the forward link 124 and the reverse link 126 may use different bands.

For another example, in a time division duplex (TDD) system and a full duplex system, the forward link 118 and the reverse link 120 may use a same band, and the forward link 124 and the reverse link 126 may use a same band.

Each antenna (or antenna group including a plurality of antennas) and/or area designed for communication is referred to as a sector of the network device 102. For example, the antenna group may be designed to communicate with a terminal device in a sector within coverage of the network device 102. The network device may send, using a single antenna, signals to all terminal devices in a sector corresponding to the single antenna. When the network device 102 respectively communicates with the terminal devices 116 and 122 over the forward links 118 and 124, transmit antennas of the network device 102 may increase signal-to-noise ratios of the forward links 118 and 124 through beamforming. In addition, compared with a manner in which the network device sends, using a single antenna, signals to all terminal devices corresponding to the single antenna, sending, by the network device 102 through beamforming, signals to the terminal devices 116 and 122 that are randomly distributed in a related coverage area causes less interference to a mobile device in a neighboring cell.

Within a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bit may be included in a transport block (or a plurality of transport blocks) of the data, and the transport block may be segmented to generate a plurality of code blocks.

In addition, the communications system 100 may be a PLMN, a D2D network, an M2M network, or another network. FIG. 1 is merely an example of a simplified schematic diagram. The network may further include another network device that is not shown in FIG. 1.

A time-frequency resource used in the communications system 100 for wireless communication is described in detail below.

In the embodiments of the present invention, the time-frequency resource used in the communications system 100 for wireless communication may be divided into a plurality of transmission time intervals (TTI) in time domain. The TTI is a commonly used parameter in a current communications system (for example, the LTE system), and is a scheduling unit for scheduling data transmission on a radio link. In the current system, it is usually considered that 1 TTI=1 ms. In other words, one TTI is one subframe or two slots. The TTI is a basic time unit in radio resource management (such as scheduling).

In a communications network, a delay is a key performance indicator, and affects use experience of a user. With development of a communications protocol, a physical layer scheduling interval that most significantly affects the delay becomes smaller. The scheduling interval (namely, the TTI) is initially 10 ms in WCDMA, then shortened to 2 ms in High Speed Packet Access (HSPA), and shortened to 1 ms in Long Term Evolution (LTE).

Due to a low-delay service requirement, a shorter TTI frame structure needs to be introduced for an LTE physical layer, to further shorten the scheduling interval. For example, a TTI length may be shortened from 1 ms to a range from one symbol to one slot (including seven symbols). The above-mentioned symbol may be an orthogonal frequency division multiplexing (OFDM) symbol or a single carrier frequency division multiple access (SC-FDMA) symbol in the LTE system, or may be a symbol in another communications system.

In data transmission that is based on a TTI whose length is 1 ms, a round trip time (RTT) of data transmission is 8 ms. It is assumed that a processing time for scheduling of a TTI whose length is less than 1 ms is proportionally reduced relative to that for scheduling of the existing TTI whose length is 1 ms. In other words, an existing RTT delay pattern is still followed. In data transmission that is based on an sTTI whose length is one slot, an RTT of data transmission is eight slots, namely, 4 ms. A delay can be half reduced relative to data transmission that is based on the TTI whose length is 1 ms. Therefore, user experience is improved.

The TTI whose length is less than one subframe (or 1 ms) may be referred to as a short transmission time interval (sTTI). For example, a length of the sTTI may be any length from one symbol to seven symbols, or a length of the sTTI may be a combination of at least two different lengths in one symbol to seven symbols. For example, 1 ms includes 4 sTTIs, and lengths of the sTTIs may separately be four symbols, three symbols, four symbols, and three symbols, or may separately be four symbols, three symbols, three symbols, and four symbols, or may be a combination of other different lengths.

Moreover, an uplink sTTI length may be the same as a downlink sTTI length. For example, the uplink sTTI length and the downlink sTTI length are each two symbols.

Alternatively, an uplink sTTI length may be greater than a downlink sTTI length. For example, the uplink sTTI length is seven symbols, and the downlink sTTI length is two symbols.

Alternatively, an uplink sTTI length may be less than a downlink sTTI length. For example, the uplink sTTI length is four symbols, and the downlink sTTI length is one subframe.

A data packet whose TTI length is less than one subframe or 1 ms is referred to as a short TTI data packet. Short TTI data transmission may be performed consecutively or inconsecutively in frequency domain. It should be noted that, for backward compatibility, both data transmission based on the TTI whose length is 1 ms and data transmission based on the sTTI may coexist in a system.

In the embodiments of the present invention, for ease of understanding and differentiation, a TTI (for example, a TTI whose length is 1 ms or a TTI whose length is greater than 1 ms) specified in the current system (for example, the LTE system) and the sTTI are collectively referred to as a TTI. In other words, in the embodiments of the present invention, a length of a TTI may be changed based on an actual need.

In the embodiments of the present invention, the time-frequency resource used in the communications system 100 may be a licensed time-frequency resource, or may be an unlicensed time-frequency resource. In other words, in the embodiments of the present invention, each communications device (for example, the network device or the terminal device) in the communications system 100 may perform communication based on a grant free transmission scheme using the time-frequency resource, or may perform communication in a grant manner using the time-frequency resource. This is not particularly limited in the embodiments of the present invention.

The unlicensed time-frequency resource is license-exempt time domain and frequency domain resources that can be shared by communications devices. Resource sharing on a license-exempt band means that for use of a particular spectrum, limitations are posed only on indicators such as transmit power and out-of-band emission, to ensure that a plurality of devices sharing the band meet a basic coexistence requirement. An operator can implement network capacity offloading using a license-exempt band resource, but needs to comply with regulatory requirements of different regions and different spectrums on the license-exempt band resource. These requirements are usually posed to protect a public system such as radar and to ensure that a plurality of systems fairly coexist and cause as little negative impact to each other as possible, and include a transmit power limit, an out-of-band emission indicator, indoor and outdoor use restrictions. Moreover, some regions further have some additional coexistence policies and the like. For example, communications devices can use a time-frequency resource through contention or listening, for example, listen before talk (LBT).

To support a large quantity of MTC services in a future network and implement low-delay and high-reliability service transmission, the grant free transmission scheme may be used. Grant free transmission may be expressed as grant free in English. The grant free transmission herein may be for uplink data transmission or downlink data transmission. The grant free transmission may be understood as any one or more of the following meanings, a combination of some technical features in a plurality of meanings, or another similar meaning:

The grant free transmission may be: A network device pre-allocates a plurality of transmission resources to a terminal device and notifies the terminal device of the transmission resources; when the terminal device has an uplink data transmission need, the terminal device selects at least one transmission resource from the plurality of transmission resources pre-allocated by the network device, and sends uplink data using the selected transmission resource; and the network device detects, on one or more transmission resources in the plurality of pre-allocated transmission resources, the uplink data sent by the terminal device. The detection may be blind detection, or may be detection performed based on a specific control field in the uplink data, or detection performed in another manner.

The grant free transmission may be: A network device pre-allocates a plurality of transmission resources to a terminal device and notifies the terminal device of the transmission resources, so that when the terminal device has an uplink data transmission need, the terminal device selects at least one transmission resource from the plurality of transmission resources pre-allocated by the network device, and sends uplink data using the selected transmission resource.

The grant free transmission may be: Information about a plurality of pre-allocated transmission resources is obtained; and when there is an uplink data transmission need, at least one transmission resource is selected from the plurality of transmission resources, and uplink data is sent using the selected transmission resource. The information may be obtained from a network device.

The grant free transmission may be a method in which uplink data transmission of a terminal device can be implemented without dynamic scheduling performed by a network device. The dynamic scheduling may be a scheduling manner in which the network device indicates a transmission resource for each uplink data transmission of the terminal device using signaling. Optionally, implementing uplink data transmission of the terminal device may be understood as allowing two or more terminal devices to transmit uplink data on a same time-frequency resource. Optionally, the transmission resource may be a transmission resource of one or more transmission time units after a moment at which the terminal device receives the signaling. A transmission time unit may be a minimum time unit, such as a TTI, of one transmission.

The grant free transmission may be: A terminal device transmits uplink data without being granted by a network device. The granting may be: The terminal device sends an uplink scheduling request to the network device, and after receiving the scheduling request, the network device sends an uplink grant to the terminal device. The uplink grant indicates an uplink transmission resource allocated to the terminal device.

The grant free transmission may be a contention-based transmission manner. Specifically, a plurality of terminals may simultaneously transmit uplink data on a same pre-allocated time-frequency resource without being granted by a base station.

The data may include service data or signaling data.

The blind detection may be understood as detecting possible data without knowing whether data has arrived. Alternatively, the blind detection may be understood as detection performed without an explicit signaling instruction.

In the embodiments of the present invention, a basic time unit of the grant free transmission may be one TTI (for example, including the foregoing sTTI). After an sTTI technology is introduced, the grant free transmission may include performing receiving on a downlink data channel whose TTI length is 1 ms or whose TTI length is less than 1 ms or performing sending on an uplink data channel whose TTI length is 1 ms or whose TTI length is less than 1 ms.

By way of example instead of limitation, in the embodiments of the present invention, a unlicensed spectrum resource may include a band near 5 GHz, a band near 2.4 GHz, a band near 3.5 GHz, and a band near 60 GHz.

By way of example instead of limitation, for example, the communications system 100 may use a licensed-assisted access using Long Term Evolution (LAA-LTE) technology, or may use a technology that supports the communications system in independent deployment on a license-exempt band, such as Standalone LTE over unlicensed spectrum, or may use an LTE-U (LTE Advanced in Unlicensed Spectrums) technology. In other words, the communications system 100 may independently deploy the LTE system on a license-exempt band, to complete communication on the license-exempt band using an LTE air interface protocol. The system does not include a licensed band. A technology such as centralized scheduling, interference coordination, or hybrid automatic request retransmission (HARQ) may be used in the LTE system deployed on the license-exempt band. Compared with an access technology such as Wi-Fi, the technology has better robustness, and can obtain higher spectral efficiency, and provide a larger coverage area and better user experience.

Moreover, by way of example instead of limitation, in the embodiments of the present invention, the communications system 100 may use, for example, a licensed-assisted access (LAA) technology, a dual connectivity (DC) technology, or a license-exempt assisted access (Standalone) technology. The LAA technology includes: using a carrier aggregation (CA) configuration and structure in the existing LTE system, and based on communication performed by configuring a carrier (licensed carrier) on a licensed band of an operator, configuring a plurality of carriers (license-exempt carriers) on a license-exempt band and performing communication using the license-exempt carriers with help of the licensed carrier. In other words, an LTE device may use, through CA, a licensed carrier as a primary component carrier (PCC) or a primary serving cell (PCell), and a license-exempt carrier as a secondary component carrier (SCC) or a secondary serving cell (SCell). The dual connectivity (DC) technology includes a technology of jointly using a licensed carrier and a license-exempt carrier in a non-CA (or non-ideal backhaul backhaul) manner, or may include a technology of jointly using a plurality of license-exempt carriers in a non-CA manner. The LTE device may alternatively be directly deployed on a license-exempt carrier through independent deployment.

In addition, in the embodiments of the present invention, each communications device in the communications system 100 may further perform wireless communication using a licensed spectrum resource. In other words, the communications system 100 in the embodiments of the present invention is a communications system that can use a licensed band.

In other words, in the embodiments of the present invention, data may be transmitted based on scheduling performed by a base station. A basic time unit for scheduling is a TTI (for example, including the foregoing sTTI). A specific scheduling procedure is: The base station sends a control channel, for example, a physical downlink control channel (PDCCH) or an enhanced physical downlink control channel (EPDCCH), where the control channel may carry scheduling information that is in different downlink control information (DCI) formats and that is used to schedule a physical downlink shared channel (PDSCH) or a physical uplink shared channel (PUSCH), and the scheduling information includes control information such as resource allocation information and a modulation and coding scheme; and a terminal device detects the control channel in a subframe, and receives a downlink data channel or sends an uplink data channel based on the scheduling information carried on the detected control channel. After the sTTI technology is introduced, the scheduling information carried on the detected control channel may instruct to receive a downlink data channel whose TTI length is 1 ms or whose TTI length is less than 1 ms or send an uplink data channel whose TTI length is 1 ms or whose TTI length is less than 1 ms.

A licensed time-frequency resource is generally a time-frequency resource that can be used only after being approved by a national or local wireless committee. Different systems such as an LTE system and a Wi-Fi system, or systems of different operators cannot share the licensed time-frequency resource.

In addition, in some embodiments in the embodiments of the present invention, the network device can provide one or more license-exempt cells (which may also be referred to as license-exempt carriers), and one or more licensed cells (which may also be referred to as licensed carriers).

In an existing wireless communications technology, if a data packet is transmitted in a TTI of 1 ms, after a network device determines a time-frequency resource used to transmit data (or a time-frequency resource scheduled by the network device for or allocated by the network device to a terminal device), such as one or more resource blocks (RB), the network device usually selects, based on a channel status of the terminal device and from a plurality of TBS values that are included in a transport block size (TBS) table and that correspond to the time-frequency resource, a TBS meeting a transmission requirement of the terminal device, and notifies the terminal device of a modulation and coding scheme (MCS) index corresponding to the TBS and information about the time-frequency resource. The terminal device determines, based on the MCS index and the information about the time-frequency resource, a TBS of the data packet transmitted in the TTI.

If a data packet is transmitted in a TTI less than 1 ms, because an existing TBS table matches a 1 ms TTI length that is based on a specific overhead assumption, after a network device determines a time-frequency resource used to transmit data, the network device usually quantizes the time-frequency resource based on a preset quantization coefficient (for example, any value between 0 and 1). The network device selects, based on a channel status of a terminal device and from a plurality of TBS values that are included in the TBS table and that correspond to the quantized time-frequency resource, a TBS meeting a transmission requirement of the terminal device, and notifies the terminal device of an MCS index corresponding to the TBS and information about the time-frequency resource. The terminal device quantizes the time-frequency resource using the same quantization coefficient and a same quantization rule to obtain the quantized time-frequency resource, and determines, based on the MCS index and the quantized time-frequency resource, a TBS of the data packet transmitted in the TTI less than 1 ms. Moreover, in the current system, one TTI length corresponds to only one fixed quantization coefficient.

In the current system, the foregoing method for determining a TBS in a TTI less than 1 ms is usually applied to a special subframe in a TDD system. Although overheads required by communication such as reference signal or control channel transmission may degrade reliability and accuracy of communication in which this TBS determining method is used, because the special subframe appears only in the TDD system and appears a maximum of twice in a 10 ms radio frame, system performance is not significantly affected.

With development of a communications technology, a short transmission time interval (sTTI), to be specific, a transmission time interval (TTI) whose length is less than one subframe (or 1 ms), is introduced into a system, to shorten a scheduling interval, meet a low-delay service requirement, and improve use experience of a user. However, in sTTI transmission, overheads required by communication such as reference signal or control channel transmission exert non-negligible impact on TBS determining, use of the foregoing method for determining a TBS in a TTI less than 1 ms affects communication reliability, accuracy, and flexibility, thereby affecting use experience of a user and system performance.

It should be understood that, an sTTI included in a subframe may be divided in different manners. By way of example instead of limitation, TTI structures corresponding to a two-symbol sTTI are used as examples for description.

Figure 2:
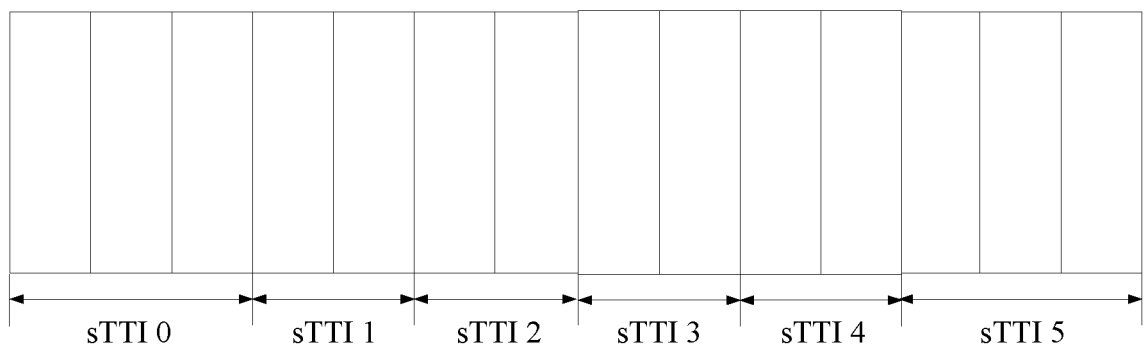
FIG. 2 is a schematic diagram of an example of a two-symbol TTI structure in a subframe.

An sTTI structure corresponding to two symbols is shown in FIG. 2. One subframe is divided into six sTTIs, and quantities of symbols included in the six sTTIs may be 3, 2, 2, 2, 2, and 3 in sequence.

Figure 3:
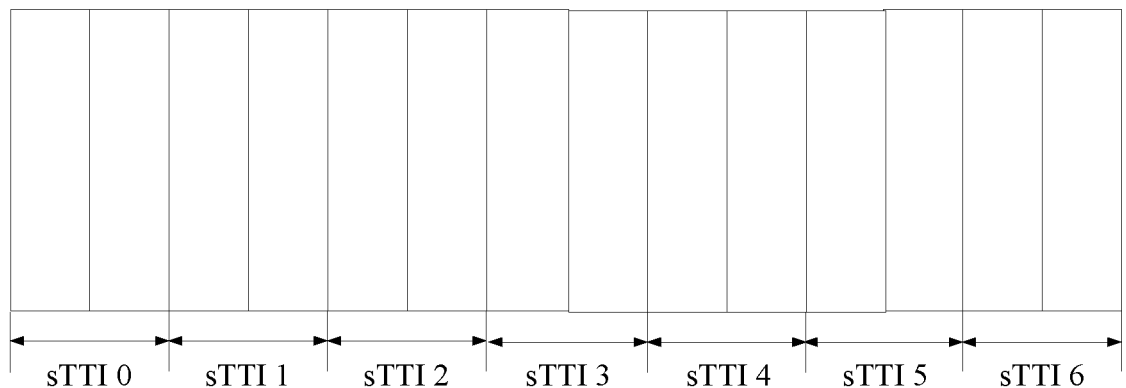
FIG. 3 is a schematic diagram of another example of a two-symbol TTI structure in a subframe.

An sTTI structure corresponding to two symbols is shown in FIG. 3. One subframe is divided into seven sTTIs, and each of the seven sTTIs includes two symbols.

Figure 4:
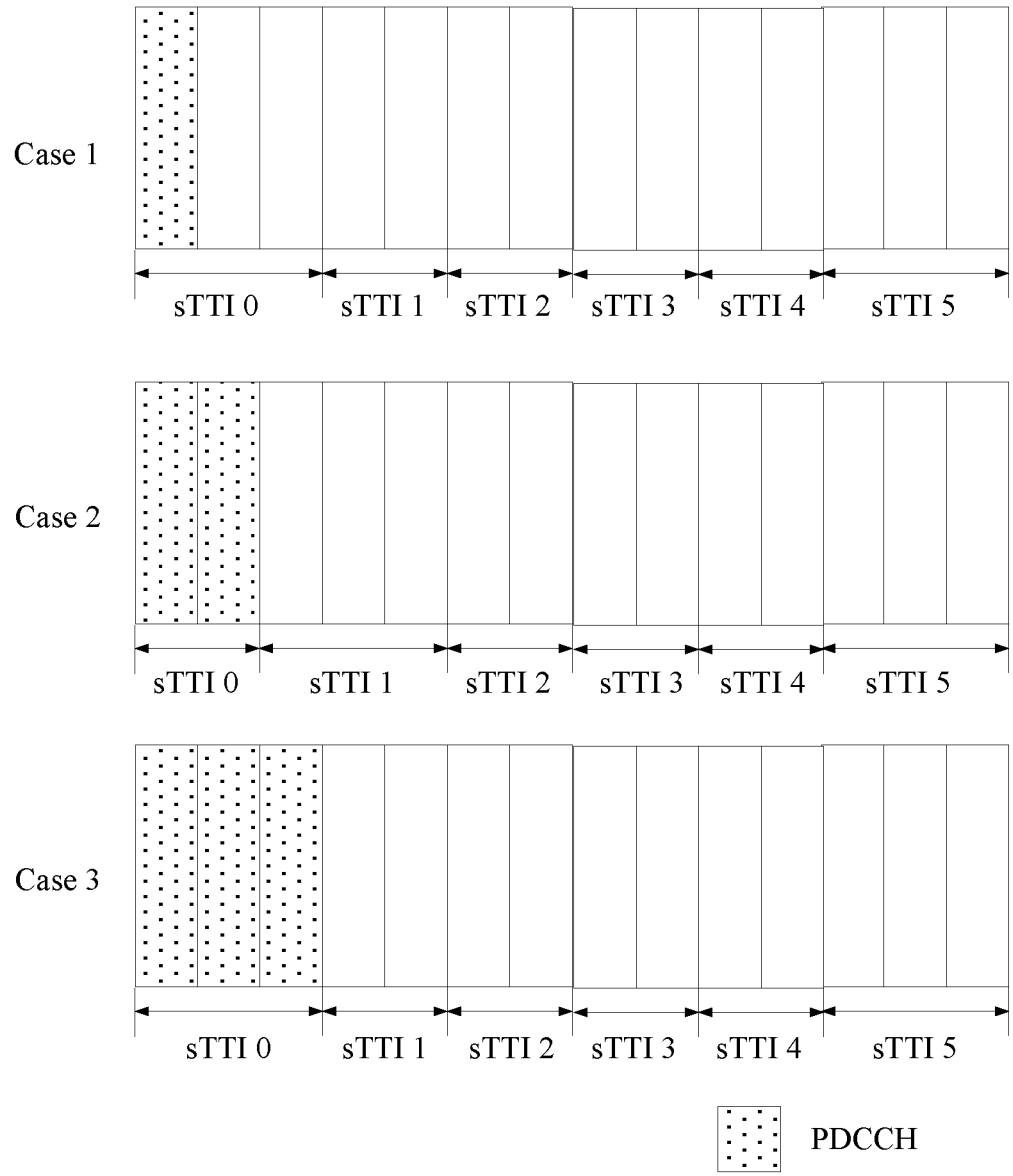
FIG. 4 is a schematic diagram of still another example of a two-symbol TTI structure in a subframe.

An sTTI structure corresponding to two symbols is shown in FIG. 4. One subframe is divided into six sTTIs, and impact from a quantity of symbols of a physical downlink control channel (PDCCH) is considered in sTTI division.

When the PDCCH occupies an odd quantity of symbols (that is, a case 1 and a case 3 in FIG. 4), quantities of symbols included in the six sTTIs may be 3, 2, 2, 2, 2, and 3 in sequence. When the PDCCH occupies an even quantity of symbols (that is, a case 2 in FIG. 4), quantities of symbols included in the six sTTIs may be 2, 3, 2, 2, 2, and 3 in sequence.

Figure 5:
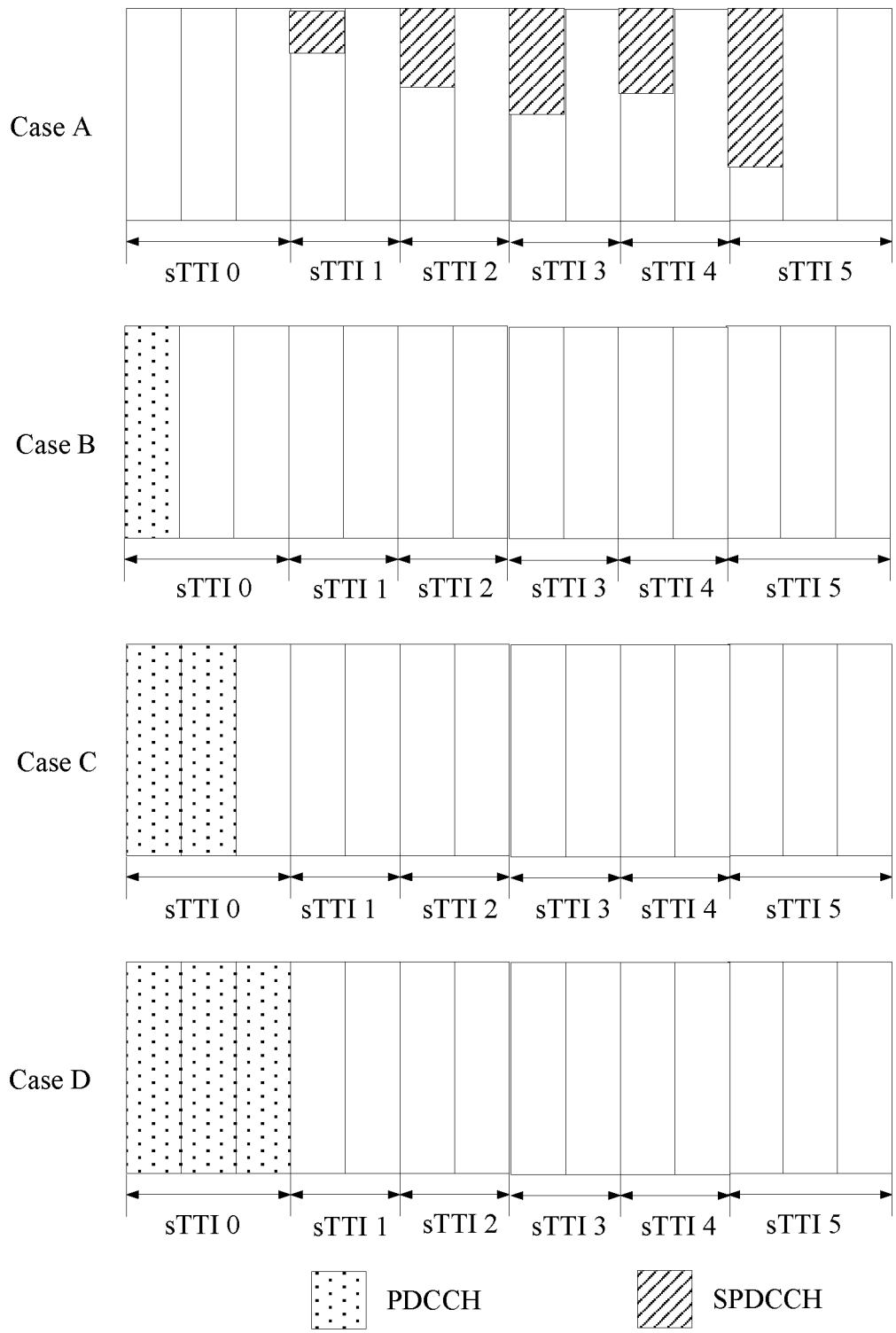
FIG. 5 is a schematic diagram of an example of different cases that may occur on overheads or an available resource in a TTI.

During sTTI transmission, a short transmission time interval physical downlink control channel (SPDCCH) may occupy a resource in an sTTI corresponding to a data channel. Resource occupancy, in this subframe (that is, the six sTTIs), of the SPDCCH may change based on actual use (for example, a case A shown in FIG. 5). Therefore, overheads (or available resources) in the sTTIs change. For an sTTI including a symbol for a PDCCH, because a quantity of symbols occupied by the PDCCH in this subframe may change (for example, a case B to a case D shown in FIG. 5), overheads (or available resources) in the sTTI change. In addition, the overheads (or the available resources) in the sTTIs further change with different reference signal configuration patterns.

Figure 6:
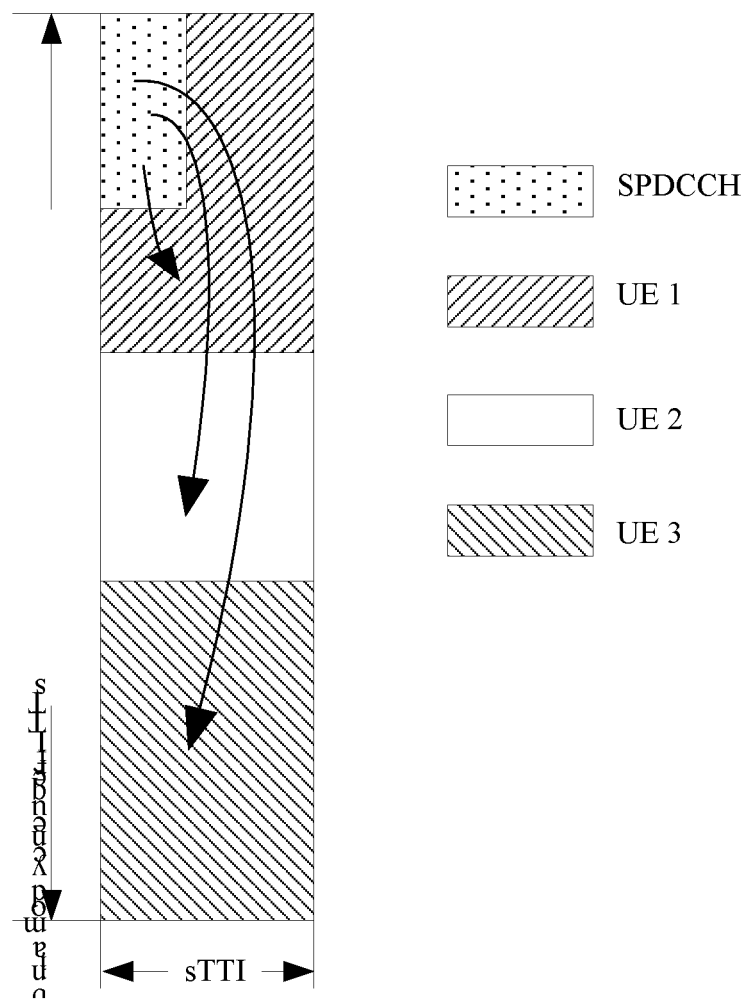
FIG. 6 is a schematic diagram of another example of different cases that may occur on overheads or an available resource in a TTI.

For another example, as shown in FIG. 6, a plurality of terminal devices may use a same TTI (for example, sTTI) through, for example, frequency division multiplexing. Moreover, control channels, for example, SPDCCHs, for a plurality of terminal devices may exist only in a time-frequency resource allocated to one terminal device, and the plurality of terminal devices may receive the SPDCCHs on the time-frequency resource. In this case, overheads, in the TTI, of a terminal device using a time-frequency resource on which the SPDCCH is configured are greater than overheads, in the TTI, of a terminal device using a time-frequency resource on which the SPDCCH is not configured.

Therefore, when overheads (or available resources) change, if one TTI length still corresponds to one fixed quantization coefficient as in the current system, communication reliability and accuracy may be degraded.

By way of example instead of limitation, cell-specific reference signal (CRS) overheads are used as an example to describe impact exerted on data transmission in different overhead scenarios by use of the existing TBS determining method in which one TTI length corresponds to one fixed quantization coefficient.

Figure 7:
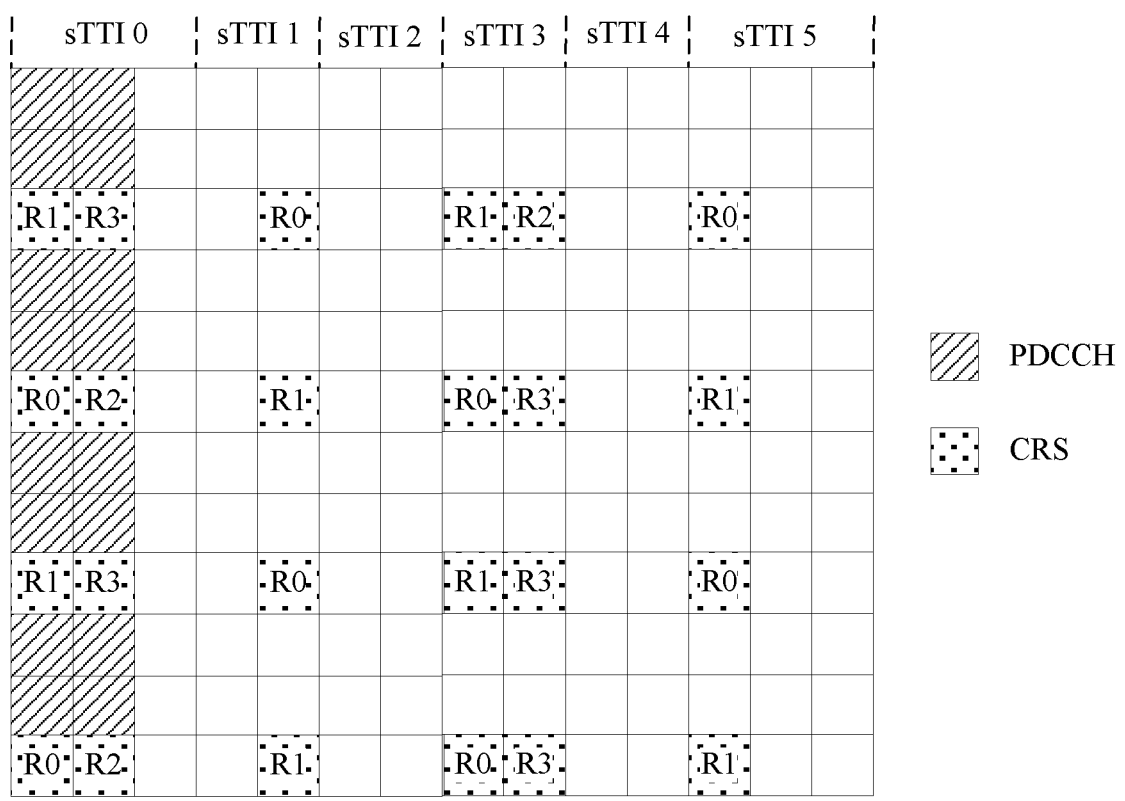
FIG. 7 is a schematic diagram of different cases that may occur on CRS overheads in a TTI.

FIG. 7 is a schematic diagram of different cases that may occur on CRS overheads, corresponding to one TTI length, in different TTIs in a scenario in which CRSs of four antenna ports are configured. It should be noted that, in FIG. 7, it is assumed that a PDCCH occupies two symbols. When an sTTI includes two symbols, a case 1 is shown in an sTTI 3 in FIG. 7, and an available resource in each RB includes 16 resource elements (RE), or in other words, overheads in each RB are eight REs. A case 2 is shown in an sTTI 4 in FIG. 7, and an available resource in each RB includes 24 RE, or in other words, overheads in each RB are zero RE.

For example, when a network device schedules (or allocates) 44 RBs for a terminal device, and a quantization coefficient is 2/11, a processing result obtained by quantizing a time-frequency resource based on the quantization coefficient is 44 RBs×2/11=8 RBs.

Therefore, based on the processing result, a plurality of TBS values in a TBS table that are corresponding to the 8 RBs may be searched for a TBS that matches a channel condition of the terminal device.

The following Table 1 shows TBSs, corresponding to the 8 RBs, in a TBS table that correspond to MCSs (for example, MCS indexes) of three modulation schemes including QPSK, 16QAM, and 64QAM. It should be noted that, a case of an MCS of a higher modulation order (for example, 256QAM) is similar to that of the three modulation schemes including QPSK, 16QAM, and 64QAM, and is not described using examples.

TABLE 1

| MCS index | TBS |
|---|---|
| 0 | 208 |
| 1 | 256 |
| 2 | 328 |
| 3 | 440 |
| 4 | 552 |
| 5 | 680 |
| 6 | 808 |
| 7 | 968 |
| 8 | 1096 |
| 9 | 1256 |
| 10 | 1256 |
| 11 | 1384 |
| 12 | 1608 |
| 13 | 1800 |
| 14 | 2024 |
| 15 | 2280 |
| 16 | 2280 |
| 17 | 2472 |
| 18 | 2600 |
| 19 | 2856 |
| 20 | 3112 |
| 21 | 3496 |
| 22 | 3752 |
| 23 | 4008 |
| 24 | 4264 |
| 25 | 4584 |
| 26 | 4968 |
| 27 | 5160 |
| 28 | 5992 |

When overheads (for example, a time-frequency resource occupied by a reference signal or a control channel) or an available resource (namely, a time-frequency resource used to carry data) in the foregoing time-frequency resource (for example, the 44 RBs) changes, a code rate corresponding to the determined TBS also changes. Table 2 shows, for the overheads or the available resources corresponding to the case 1 and the case 2, transmission code rates corresponding to TBSs corresponding to MCSs (for example, MCS indexes).

TABLE 2

| Modulation order | MCS index | TBS | Code rate in the case 1 | Code rate in the case 2 |
|---|---|---|---|---|
| 2 | 0 | 208 | 0.165 | 0.110 |
| 2 | 1 | 256 | 0.199 | 0.133 |
| 2 | 2 | 328 | 0.250 | 0.167 |
| 2 | 3 | 440 | 0.330 | 0.220 |
| 2 | 4 | 552 | 0.409 | 0.273 |
| 2 | 5 | 680 | 0.500 | 0.333 |
| 2 | 6 | 808 | 0.591 | 0.394 |
| 2 | 7 | 968 | 0.705 | 0.470 |
| 2 | 8 | 1096 | 0.795 | 0.530 |
| 2 | 9 | 1256 | 0.909 | 0.606 |
| 4 | 10 | 1256 | 0.455 | 0.303 |
| 4 | 11 | 1384 | 0.500 | 0.333 |
| 4 | 12 | 1608 | 0.580 | 0.386 |
| 4 | 13 | 1800 | 0.648 | 0.432 |
| 4 | 14 | 2024 | 0.727 | 0.485 |
| 4 | 15 | 2280 | 0.818 | 0.545 |
| 6 | 16 | 2280 | 0.545 | 0.364 |
| 6 | 17 | 2472 | 0.591 | 0.394 |
| 6 | 18 | 2600 | 0.621 | 0.414 |
| 6 | 19 | 2856 | 0.682 | 0.455 |
| 6 | 20 | 3112 | 0.742 | 0.495 |

TABLE 2-continued

| Modulation order | MCS index | TBS | Code rate in the case 1 | Code rate in the case 2 |
|---|---|---|---|---|
| 6 | 21 | 3496 | 0.833 | 0.556 |
| 6 | 22 | 3752 | 0.894 | 0.596 |
| 6 | 23 | 4008 | 0.955 | 0.636 |
| 6 | 24 | 4264 | 1.015 | 0.677 |
| 6 | 25 | 4584 | 1.091 | 0.727 |
| 6 | 26 | 4968 | 1.182 | 0.788 |
| 6 | 27 | 5160 | 1.227 | 0.818 |
| 6 | 28 | 5992 | 1.424 | 0.949 |

For example, as shown in Table 2, a smallest MCS (namely, an MCS whose index is 0) in the case 1 corresponds to a higher code rate. In other words, the code rate corresponding to the smallest MCS in the case 1 is greater than a code rate corresponding to a smallest MCS in the case 2. A lower code rate indicates a lower signal-to-noise ratio that is required to correctly demodulate a transport block corresponding to the low code rate, and data transmission of a terminal device having an even lower signal-to-noise ratio (for example, a terminal device at a relatively long distance from the network device is more likely to have a relatively low signal-to-noise ratio) can be supported using the low code rate. Therefore, a larger coverage area can be supported. In other words, when transmission accuracy is ensured, a maximum distance, allowed in the case 1, between a terminal device and the network device is less than a maximum distance, allowed in the case 2, between a terminal device and the network device. Consequently, when a fixed quantization coefficient is used, a coverage area of the network device or the terminal device changes with different overheads (or different available resources), affecting transmission reliability and accuracy.

For another example, as shown in Table 2, a modulation order switching location (namely, an MCS whose index is 9 or 15) in the case 1 corresponds to a relatively high code rate (for example, the MCS whose index is 9 corresponds to a code rate of 0.909, and the MCS whose index is 15 corresponds to a code rate of 0.818), which is higher than a critical code rate for modulation order switching in the current system (for example, a critical code rate for switching from QPSK to 16QAM or from 16QAM to 64QAM is usually 0.65, and a critical code rate for switching from 64QAM to 256QAM is usually 0.85). Because the critical code rate for modulation order switching in the current system is obtained through simulation, when a transport block corresponding to low-order modulation reaches or exceeds the critical code rate, transmission reliability can be improved by switching the transport block to high-order modulation, thereby improving spectral efficiency. Consequently, when a fixed quantization coefficient is used, modulation order switching locations corresponding to different overheads (or different available resources) correspond to different code rates, affecting transmission reliability and spectral efficiency.

For another example, as required in the current system, for example, a Long Term Evolution ("LTE" for short) system, when receiving a data packet whose code rate is higher than 0.93 or 0.931, a receive end (for example, a terminal device) may not decode the data packet. In other words, a highest code rate of the LTE system is 0.93 or 0.931. As shown in Table 2, a code rate corresponding to a relatively high MCS (for example, MCSs whose indexes are 23 to 28) in the case 1 is higher than the highest code rate. Consequently, when a fixed quantization coefficient is used, a relatively high MCS cannot be used when overheads are relatively high (or there are a relatively small quantity of available resources), affecting transmission reliability, accuracy, and flexibility. For the case 2, a code rate corresponding to an MCS whose index is 28 is higher than the highest code rate. Consequently, when a fixed quantization coefficient is used, the MCS whose index is 28 cannot be used, and a highest code rate that can be used is a code rate of 0.818 corresponding to an MCS whose index is 27. In other words, the highest code rate that can be used is less than the highest code rate supported by the system, affecting a transmission peak rate.

Figure 8:
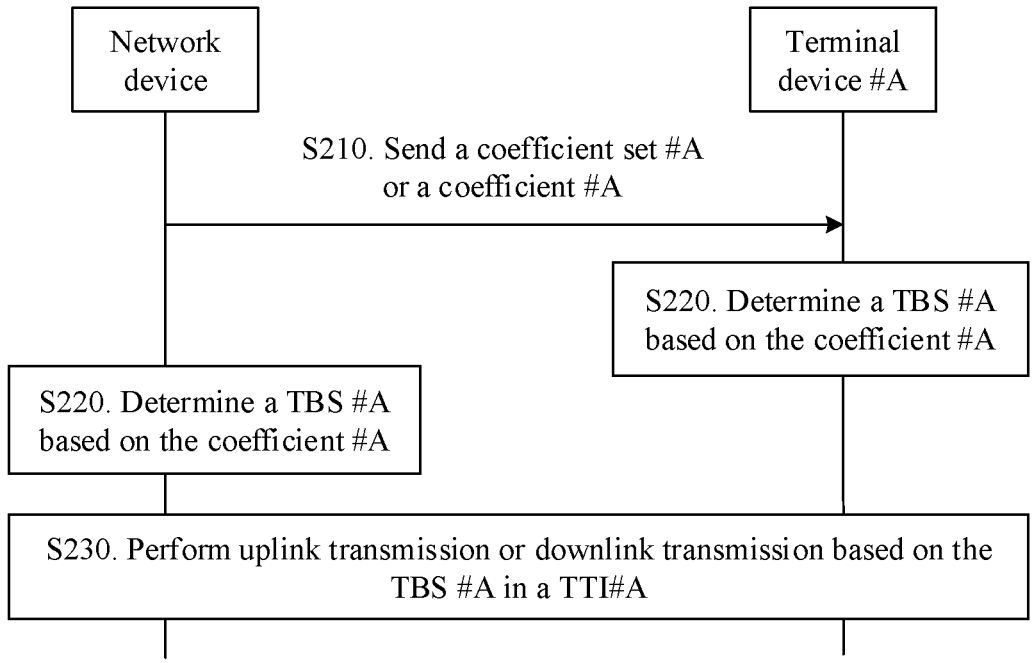
FIG. 8 is a schematic interaction diagram of an example of a wireless communication method according to an embodiment of the present invention.

A specific process of a wireless communication method 200 in an embodiment of the present invention is described in detail below with reference to FIG. 8. FIG. 8 is a schematic interaction diagram of an example of the wireless communication method 200 according to this embodiment of the present invention.

In this embodiment of the present invention, a network device and a terminal device may communicate in one or more TTIs. Processes for processing all the TTIs are similar. Herein, for ease of understanding and description, a process for processing a TTI # A by the network device and the terminal device is used as an example for description.

As shown in FIG. 8, in S210, the network device and a terminal device # A (namely, an example of the terminal device) may determine a coefficient set (namely, an example of a first coefficient set, which is denoted by a coefficient set # A below for ease of understanding and differentiation) corresponding to the TTI # A.

The coefficient set # A includes at least two coefficients (which may also be referred to as quantization coefficients) used to determine a TBS for uplink transmission in the TTI # A, or at least two coefficients used to determine a TBS for downlink transmission in the TTI # A.

By way of example instead of limitation, in this embodiment of the present invention, a value of each coefficient may be any value between 0 and 1 (for example, any decimal value between 0 and 1 or any fraction value between 0 and 1, including 1). It should be understood that, the above-enumerated specific values of the coefficients included in the coefficient set in this embodiment of the present invention are merely examples for description, this embodiment of the present invention is not limited thereto, and a person skilled in the art may set the specific values of the coefficients to any values based on an actual need. In addition, a person skilled in the art may set, based on an actual need, any specific quantity of coefficients included in the coefficient set. This is not particularly limited in this embodiment of the present invention.

By way of example instead of limitation, in this embodiment of the present invention, the TTI # A may be a TTI that includes less than 7 and greater than or equal to 1 symbols. For example, a quantity of symbols included in the TTI # A may be any value in {1, 2, 3, 4, 5, 6}.

In other words, in this embodiment of the present invention, for uplink transmission, a coefficient set corresponding to a TTI that includes less than 7 symbols includes at least two coefficients, and a TTI that includes greater than or equal to 7 symbols corresponds to one coefficient used to determine a TBS. Alternatively, for downlink transmission, a coefficient set corresponding to a TTI that includes less than 7 symbols includes at least two coefficients, and a TTI that includes greater than or equal to 7 symbols corresponds to one coefficient used to determine a TBS.

In the TTI including less than 7 symbols, overheads of a reference signal, a control channel, or the like exert large impact on TBS determining, and transmission reliability, accuracy, and flexibility can be improved using at least two coefficients. In the TTI including greater than or equal to 7 symbols, overheads of a reference signal, a control channel, or the like exert relatively small impact on TBS determining, and using one coefficient can simplify implementation of the network device or the terminal device.

A manner for determining values of the coefficients included in the coefficient set # A is described below using examples.

Manner 1

Optionally, the coefficients included in the coefficient set # A (for example, a quantity of coefficients included in the coefficient set # A, or coefficient values of the coefficients included in the coefficient set # A) may be determined based on a quantity of symbols included in the TTI # A.

In other words, in this embodiment of the present invention, a coefficient set may be configured for a TTI (for example, the TTI # A) based on a quantity of symbols included in the TTI.

By way of example instead of limitation, for example, when the TTI # A includes one symbol, the coefficient set # A may include at least coefficients {1/11, 1/12}.

For another example, when the TTI # A includes two symbols, the coefficient set # A may include at least coefficients {2/11, 1/6}.

For another example, when the TTI # A includes three symbols, the coefficient set # A may include at least coefficients {3/11, 1/4}.

For another example, when the TTI # A includes four symbols, the coefficient set # A may include at least coefficients {4/11, 1/3}.

For another example, when the TTI # A includes five symbols, the coefficient set # A may include at least coefficients {5/11, 5/12}.

For another example, when the TTI # A includes six symbols, the coefficient set # A may include at least coefficients {6/11, 1/2}.

Manner 2

Optionally, the coefficients included in the coefficient set # A (for example, a quantity of coefficients included in the coefficient set # A, or coefficient values of the coefficients included in the coefficient set # A) may be determined based on a TTI structure of a subframe (denoted by a subframe # A below for ease of understanding and differentiation) to which the TTI # A belongs.

In other words, in this embodiment of the present invention, a coefficient set may be configured for a TTI (for example, the TTI # A) based on a TTI division manner (or a TTI pattern or a TTI structure) included in a subframe (for example, the subframe # A) to which the TTI belongs.

By way of example instead of limitation, for example, a TTI structure corresponding to the subframe # A is shown in FIG. 2. When the subframe # A is divided into six TTIs, and quantities of symbols included in the six TTIs may be 3, 2, 2, 2, 2, and 3 in sequence, the coefficient set # A may include at least coefficients {1/12, 1/6, 1/4}.

For another example, a TTI structure corresponding to the subframe # A is shown in FIG. 3. When the subframe # A is divided into seven TTIs, and each of the seven TTIs includes two symbols, the coefficient set # A may include at least coefficients {2/11, 1/6}.

For another example, when the subframe # A is divided into six TTIs, and quantities of symbols included in the six TTIs differ with parity of a quantity of symbols of a PDCCH, the coefficient set # A may include at least coefficients {1/6, 1/4}.

For another example, when the subframe # A is divided into four TTIs, and quantities of symbols included in the four TTIs are 4, 3, 4, and 3 in sequence, the coefficient set # A may include at least coefficients {1/3, 1/4}.

It should be understood that, the above-enumerated manners for determining the coefficient set # A are merely examples for description, and this embodiment of the present invention is not limited thereto. For example, a quantity X of coefficients included in the coefficient set # A may alternatively be determined based on a specification in a communications system or a communications protocol or a requirement of a user or a telecommunications operator, and 1 may be equally divided based on the quantity X to determine a difference between two adjacent coefficients after sorting in numerical order, namely, 1/(X+1), to determine the coefficients included in the coefficient set # A. For example, when X is 4, the coefficients included in the coefficient set # A may be {0.2, 0.4, 0.6, 0.8}. For another example, when X is 2, the coefficients included in the coefficient set # A may be {1/3, 2/3}.

In this embodiment of the present invention, the process of determining the coefficient set # A may be performed by the network device, and the network device indicates the determined coefficient set # A to the terminal device # A using signaling (namely, an example of second indication information). Alternatively, the process of determining the coefficient set # A may be performed by the network device and the terminal device # A according to a same rule, so that coefficient sets # A determined by the network device and the terminal device # A are the same. Alternatively, the coefficient set # A may be specified in the communications system or the communications protocol, and the network device or the terminal device # A may obtain the coefficient set # A after accessing the communications system. Alternatively, the coefficient set # A may be preset by a manufacturer in the network device or the terminal device # A as default setting. Alternatively, the coefficient set # A may be entered by a user or an administrator to the network device and the terminal device # A. Alternatively, the process of determining the coefficient set # A may be performed by a device (for example, a device such as an MME) other than the network device and the terminal device # A, and the device delivers the coefficient set # A to the network device or the terminal device # A. In other words, in this embodiment of the present invention, a specific determining method and process are not particularly limited, provided that coefficient sets # A determined by the network device and the terminal device # A for the TTI # A are the same.

By way of example instead of limitation, for example, in this embodiment of the present invention, TTIs may be classified based on, for example, a parameter such as quantities of symbols included in the TTIs or TTI structures of subframes to which the TTIs belong. For example, TTIs including a same quantity of symbols belong to a same type, or TTIs belonging to subframes having a same TTI structure belong to a same type. Moreover, TTIs belonging to a same type may use a same parameter set. One type of TTI may include one or more TTI lengths. This is not particularly limited in this embodiment of the present invention. For another example, in this embodiment of the present invention, different types of TTIs may use a same parameter set.

Subsequently, the network device may determine, from the coefficient set # A based on current use of the TTI # A, a parameter (namely, an example of a first parameter, which is denoted by a parameter # A below for ease of understanding) corresponding to the current use of the TTI # A.

In this embodiment of the present invention, a plurality of parameters in the coefficient set # A may correspond to different overhead ranges (namely, a case α), or may correspond to different MCS sets (namely, a case β), or may correspond to different frequency domain resource quantity ranges (namely, a case γ), or may correspond to different TBS sets (namely, a case 11). A method and process for determining the parameter # A in the foregoing cases are separately described below.

Case α

First, a concept "overheads" in this embodiment of the present invention is illustrated.

In this embodiment of the present invention, the "overheads" are a resource, in a time-frequency resource (for example, a time-frequency resource scheduled by the network device or used in a grant free manner), occupied by information other than data (specifically, a quantity or proportion of occupied resources in the time-frequency resource). It should be noted that, the "overheads" may include all resources or some resources in a time-frequency resource that are occupied by information other than data.

For example, overheads in a time-frequency resource (namely, an example of a first time-frequency resource, which is denoted by a time-frequency resource # A below for ease of understanding and differentiation) used by the terminal device # A in the TTI # A may be a quantity or proportion of resources in the time-frequency resource # A that are used to carry information other than data.

The time-frequency resource # A may be a resource allocated by the network device to the terminal device # A, or may be a resource used by the terminal device # A in a grant free manner. This is not particularly limited in this embodiment of the present invention.

For uplink transmission:

By way of example instead of limitation, when the TTI # A is used for uplink transmission, the "information other than data" may include at least one of an uplink reference signal and uplink control information.

The uplink reference signal includes any one or more of signals such as a demodulation reference signal (DMRS) used for uplink data channel demodulation and a sounding reference signal (SRS) used for uplink channel measurement.

When the uplink control information is multiplexed onto an uplink data channel for transmission, the uplink control information occupies a resource in a TTI corresponding to the uplink data channel.

Correspondingly, the "overheads" may include a quantity of resources occupied by at least one of the uplink reference signal and the uplink control information, or a proportion of an occupied resource in the time-frequency resource # A.

A quantity of resources occupied by the uplink reference signal may be a quantity of resource elements REs occupied by the uplink reference signal, or a quantity of symbols occupied by the uplink reference signal.

A quantity of resources occupied by the uplink control information may be a quantity of REs occupied by the uplink control information, a quantity of RBs occupied by the uplink control information, or a quantity of symbols occupied by the uplink control information.

By way of example instead of limitation, the "overheads" include a quantity or proportion of resources in the time-frequency resource # A that are occupied by the uplink control information.

By way of example instead of limitation, the "overheads" include a quantity or proportion of resources in the time-frequency resource # A that are occupied by the uplink reference signal and the uplink control information.

For downlink transmission:

By way of example instead of limitation, when the TTI # A is used for downlink transmission, the "information other than data" may include at least one of a downlink reference signal and a downlink control channel.

Specifically, the downlink control channel may include any one or more of channels such as a physical downlink control channel (PDCCH), an enhanced physical downlink control channel (EPDCCH), a machine type communication physical downlink control channel (MPDCCH), and a short transmission time interval physical downlink control channel (SPDCCH).

The downlink reference signal includes any one or more of signals such as a cell-specific reference signal (CRS), a terminal device-specific reference signal (UE-specific Reference Signal, UE-RS, which is also referred to as a demodulation reference signal or a DMRS), a channel state information reference signal (CSI-RS), a group-specific reference signal (GRS), a positioning reference signal (PRS) used for positioning, a beam reference signal (BRS), a beam refinement reference signal (BRRS), a phase compensation reference signal (PCRS), a primary synchronization signal (PSS), a secondary synchronization signal (SSS), and a discovery reference signal (DRS, which is also referred to as a discovery signal).

Correspondingly, the "overheads" may include a quantity of resources occupied by at least one of the downlink reference signal and the downlink control channel, or a proportion of an occupied resource in the time-frequency resource # A.

A quantity of resources occupied by the downlink reference signal may be a quantity of REs occupied by the downlink reference signal, or a quantity of symbols occupied by the downlink reference signal.

A quantity of resources occupied by the downlink control channel may be a quantity of REs occupied by the downlink control channel, a quantity of RBs occupied by the downlink control channel, or a quantity of control channel elements (CCE) occupied by the downlink control channel.

By way of example instead of limitation, the "overheads" include a quantity or proportion of resources in the time-frequency resource # A that are occupied by the CRS.

By way of example instead of limitation, the "overheads" include a quantity or proportion of resources in the time-frequency resource # A that are occupied by the DMRS.

By way of example instead of limitation, the "overheads" include a quantity or proportion of resources in the time-frequency resource # A that are occupied by the downlink control channel.

By way of example instead of limitation, the "overheads" include a quantity or proportion of resources in the time-frequency resource # A that are occupied by the CRS and the DMRS.

By way of example instead of limitation, the "overheads" include a quantity or proportion of resources in the time-frequency resource # A that are occupied by the CRS and the downlink control channel.

By way of example instead of limitation, the "overheads" include a quantity or proportion of resources in the time-frequency resource # A that are occupied by the CRS, the DMRS, and the downlink control channel.

It should be noted that, in this embodiment of the present invention, an RB may include, in time domain, all symbols of a TTI to which the RB belongs. In other words, a length of an RB in time domain may be the same as a length of a TTI to which the RB belongs. Therefore, the length of the RB in time domain varies with different TTIs to which the RB belongs. For example, a length, in time domain, of an RB in a TTI whose length is two symbols may be two symbols. For another example, a length, in time domain, of an RB in a TTI whose length is three symbols may be three symbols. Descriptions of same or similar cases are omitted below.

In addition, in this embodiment of the present invention, an RB may include a plurality of (for example, 12) subcarriers in frequency domain. Moreover, RBs in different TTIs may include a same quantity of subcarriers in frequency domain. Descriptions of same or similar cases are omitted below.

In this embodiment of the present invention, assuming that the coefficient set # A includes N coefficients, the N coefficients may correspond to K overhead ranges.

In this embodiment of the present invention, one overhead range may include one or more overheads (specifically, one or more overhead values), and an intersection between any two overhead ranges may be an empty set.

In this embodiment of the present invention, each of the K overhead ranges corresponds to at least one of the N coefficients.

It should be noted that, in this embodiment of the present invention, any two overhead ranges may include a same quantity or different quantities of overhead values. This is not particularly limited in this embodiment of the present invention.

Moreover, in this embodiment of the present invention, any two overhead ranges may correspond to a same quantity or different quantities of coefficients. This is not particularly limited in this embodiment of the present invention.

Moreover, in this embodiment of the present invention, there is at least one different coefficient in coefficients corresponding to any two overhead ranges.

Generally, for any overhead range (denoted by an overhead range #1 below for ease of understanding) in the K overhead ranges, the overhead range #1 may correspond to one or more coefficients (denoted by a coefficient group #1-1 below for ease of understanding) in the N coefficients.

In addition, for another overhead range (denoted by an overhead range #2 below for ease of understanding) in the K overhead ranges, the overhead range #2 may also correspond to one or more coefficients (denoted by a coefficient group #1-2 below for ease of understanding) in the N coefficients.

It should be noted that, in this embodiment of the present invention, the coefficient group #1-1 is different from the coefficient group #1-2. Specifically, there is at least one different coefficient in the coefficient group #1-1 and the coefficient group #1-2.

Preferably, in this embodiment of the present invention, K=N. In other words, the N coefficients included in the coefficient set # A may be in a one-to-one correspondence with the N overhead ranges.

Therefore, as described above, in this embodiment of the present invention, there may be a mapping relationship (denoted by a mapping relationship # A below for ease of understanding and differentiation) between the N coefficients included in the coefficient set # A and a plurality of (for example, N) overhead ranges, and each overhead range may correspond to at least one coefficient.

A specific value of each overhead range (or a specific value of one or more overheads included in each overhead range) may be set to any value.

For example, by way of example instead of limitation, possible maximum overheads in the time-frequency resource # A in the TTI # A is denoted by overheads # MAX, the K overhead ranges may include an overhead range # K1, the overhead range # K1 includes at least the overheads # MAX, and a coefficient corresponding to the overhead range # K1 does not include a largest coefficient in the N coefficients. In this way, a relatively small coefficient is used for the overhead range # K1 including the overheads # MAX, so that a relatively small TBS can be selected to adapt to transmission in the TTI # A in a scenario of relatively large overheads, to improve transmission reliability.

For example, by way of example instead of limitation, possible minimum overheads in the time-frequency resource # A in the TTI # A is denoted by overheads # MIN, the K overhead ranges may include an overhead range # K2, the overhead range # K2 includes at least the overheads # MIN, and a coefficient corresponding to the overhead range # K2 does not include a smallest coefficient in the N coefficients. In this way, a relatively large coefficient is used for the overhead range # K2 including the overheads # MIN, so that a relatively large TBS can be selected to adapt to transmission in the TTI # A in a scenario of relatively small overheads, to increase a transmission throughput.

For example, by way of example instead of limitation, in the time-frequency resource # A in the TTI # A, possible maximum overheads are denoted by overheads # MAX, and possible minimum overheads are denoted by overheads # MIN. The N overhead ranges may be obtained by performing linear or non-linear interpolation between values corresponding to the overheads # MAX and the overheads # MIN. Then, a coefficient corresponding to the overheads # MAX is determined as S1, a coefficient corresponding to the overheads # MIN is determined as S2, and the quantity of coefficients included in the coefficient set # A is determined as N. Finally, linear or non-linear interpolation is performed between the coefficient S1 and the coefficient S2 based on the quantity N, to determine the coefficients included in the coefficient set # A. For example, if linear interpolation is performed between the coefficient S1 and the coefficient S2, assuming that the coefficient S2 is greater than the coefficient S1, and the coefficient set # A includes N coefficients, a difference between coefficients included in the coefficient set # A is (S2−S1)/(N−1).

For example, by way of example instead of limitation, it is assumed that in a two-symbol TTI, overheads # MAX are 60% and correspond to a coefficient S1 of 1/10, and overheads # MIN are 0 and correspond to a coefficient S2 of 1/5. When N is 4, the following Table 3 shows an example of the mapping relationship # A. It should be noted that, overhead ranges and coefficients in Table 3 are examples, and may be set to any specific values based on an actual need.

TABLE 3

| Overhead range x | Coefficient |
| --- | --- |
| 0 ≤ x ≤ 15% | 1/5 |
| 15% < x ≤ 30% | 1/6 |
| 30% < x ≤ 45% | 2/15 |
| 45% < x ≤ 60% | 1/10 |

For another example, by way of example instead of limitation, it is assumed that in a two-symbol TTI, overheads # MAX are 60% and correspond to a coefficient S1 of 1/10, and overheads # MIN are 0 and correspond to a coefficient S2 of 1/5. When N is 2, the following Table 4 shows an example of the mapping relationship # A. It should be noted that, overhead ranges and coefficients in Table 4 are examples, and may be set to any specific values based on an actual need.

TABLE 4

| Overhead range x | Coefficient |
|---|---|
| 0 ≤ x ≤ 30% | 1/5 |
| 30% < x ≤ 60% | 1/10 |

For another example, by way of example instead of limitation, the following Table 5 shows another example of the mapping relationship # A. It should be noted that, overhead ranges and coefficients in Table 5 are examples, and may be set to any specific values based on an actual need.

TABLE 5

| Overhead range x | Coefficient |
|---|---|
| 0 ≤ x ≤ 15% | 1 |
| 15% < x ≤ 30% | 0.8 |
| 30% < x ≤ 45% | 0.65 |
| 45% < x ≤ 60% | 0.5 |

Therefore, the network device may determine, based on overheads (namely, an example of first overheads, which are denoted by overheads # A below for ease of understanding and differentiation) in the time-frequency resource # A and from a plurality of overhead ranges corresponding to the coefficient set # A, an overhead range (namely, an example of a first overhead range, which is denoted by an overhead range # A below for ease of understanding and differentiation) to which the overheads # A belong. Then the network device may determine, based on the overhead range # A and the mapping relationship # A, a coefficient corresponding to the overhead range # A as a coefficient (namely, an example of a first coefficient, which is denoted by a coefficient # A below for ease of understanding and description) used by the terminal device # A in the TTI # A.

By way of example instead of limitation, the terminal device # A may also determine the coefficient # A from the coefficient set # A based on the overheads # A. Moreover, a specific method and process in which the terminal device # A determines the coefficient # A from the coefficient set # A based on the overheads # A may be similar to the specific method and process in which the network device determines the coefficient # A from the coefficient set # A based on the overheads # A. To avoid repetition, detailed descriptions are omitted herein.

The network device or the terminal device # A can flexibly select, as the first coefficient, a coefficient meeting a current use requirement of the TTI, thereby further improving the reliability and the accuracy of wireless communication.

Moreover, in this embodiment of the present invention, a reference signal in the time-frequency resource # A may include a reference signal used by the terminal device # A, and may also include a reference signal used by another terminal device. A control channel in the time-frequency resource # A may include a control channel used (or sent or received) by the terminal device # A, and may also include a control channel used (or sent or received) by another terminal device. This is not particularly limited in this embodiment of the present invention.

It should be noted that, as described above, the overhead range # A may correspond to a plurality of coefficients. In this case, the following processing manner may be used:

For example, the network device may determine, according to a preset rule, the coefficient # A from the plurality of coefficients corresponding to the overhead range # A. By way of example instead of limitation, the network device may use a largest (or smallest) coefficient in the plurality of coefficients corresponding to the overhead range # A as the coefficient # A.

For another example, the plurality of coefficients corresponding to the overhead range # A may be in a one-to-one correspondence with a plurality of parameter groups, and the network device may determine, based on a parameter group currently used by (or corresponding to) the terminal device # A and from the plurality of coefficients corresponding to the overhead range # A, a coefficient corresponding to the parameter group currently used by (or corresponding to) the terminal device # A as the coefficient # A. By way of example instead of limitation, in this embodiment of the present invention, any one of the plurality of parameter groups may include at least one of the following parameters: an MCS, a frequency domain resource quantity range, and channel state information (CSI). The CSI may include at least one of a channel quality indicator (CQI), a precoding matrix indicator (PMI), and a rank indicator (RI).

By way of example instead of limitation, the plurality of parameters in the coefficient set # A may correspond to different available resource ranges. An available resource may correspond to the foregoing overheads. In other words, the overheads may be a quantity or proportion of resources in a time-frequency resource that are occupied by information other than data, and oppositely, the available resource may be a quantity or proportion of resources in the time-frequency resource that are occupied by the data. The data may be carried on a PDSCH or a PUSCH. Moreover, a method and process for determining the coefficient based on an available resource in the time-frequency resource # A may be similar to the method and process for determining the coefficient based the overheads # A. To avoid repetition, detailed descriptions are omitted herein.

For example, by way of example instead of limitation, it is assumed that in a two-symbol TTI, a maximum available resource is 100% and corresponds to a coefficient of 1/5, and a minimum available resource is 40% and corresponds to a coefficient of 1/10. When the coefficient set # A includes four coefficients, the following Table 6 shows an example of a mapping relationship between available resource ranges and the coefficients in the coefficient set # A. It should be noted that, available resource ranges and coefficients in Table 6 are examples, and may be set to any specific values based on an actual need.

TABLE 6

| Available resource range y | Coefficient |
|---|---|
| 85% ≤ y ≤ 100% | 1/5 |
| 70% < y ≤ 85% | 1/6 |
| 55% < y ≤ 70% | 2/15 |
| 40% < y ≤ 55% | 1/10 |

For another example, by way of example instead of limitation, the following Table 7 shows an example of a mapping relationship between available resource ranges and the coefficients in the coefficient set # A. It should be noted that, available resource ranges and coefficients in Table 7 are examples, and may be set to any specific values based on an actual need.

TABLE 7

| Available resource range y | Coefficient |
|---|---|
| 85% ≤ y ≤ 100% | 1 |
| 70% < y ≤ 85% | 0.8 |
| 55% < y ≤ 70% | 0.65 |
| 40% < y ≤ 55% | 0.5 |

Therefore, the network device may determine, based on the available resource (namely, an example of a first available resource, which is denoted by an available resource # A below for ease of understanding and differentiation) in the time-frequency resource # A and from a plurality of available resource ranges corresponding to the coefficient set # A, an available resource range (namely, an example of a first available resource range, which is denoted by an available resource range # A below for ease of understanding and differentiation) to which the available resource # A belongs. Then the network device may determine, based on the available resource range # A and a mapping relationship # A', a coefficient corresponding to the available resource range # A as the coefficient # A used by the terminal device # A in the TTI # A.

By way of example instead of limitation, in this embodiment of the present invention, the terminal device # A may also determine the coefficient # A from the coefficient set # A based on the available resource # A. Moreover, a specific method and process in which the terminal device # A determines the coefficient # A from the coefficient set # A based on the available resource # A may be similar to the specific method and process in which the network device determines the coefficient # A from the coefficient set # A based on the available resource # A. To avoid repetition, detailed descriptions are omitted herein.

The network device or the terminal device # A can flexibly select, as the first coefficient, a coefficient meeting a current use requirement of the TTI, thereby further improving the reliability and the accuracy of wireless communication.

Case β

In this embodiment of the present invention, assuming that the coefficient set # A includes N coefficients, the N coefficients may correspond to M MCS sets.

In this embodiment of the present invention, one MCS set may include one or more MCSs, and an intersection between any two MCS sets may be an empty set.

In this embodiment of the present invention, each of the M MCS sets corresponds to at least one of the N coefficients.

It should be noted that, in this embodiment of the present invention, any two MCS sets may include a same quantity or different quantities of MCSs. This is not particularly limited in this embodiment of the present invention.

Moreover, in this embodiment of the present invention, any two MCS sets may correspond to a same quantity or different quantities of coefficients. This is not particularly limited in this embodiment of the present invention.

Moreover, in this embodiment of the present invention, there is at least one different coefficient in coefficients corresponding to any two MCS sets.

Generally, for any MCS set (denoted by an MCS set #1 below for ease of understanding) in the M MCS sets, the MCS set #1 may correspond to one or more coefficients (denoted by a coefficient group #2-1 below for ease of understanding) in the N coefficients.

In addition, for another MCS set (denoted by an MCS set #2 below for ease of understanding) in the M MCS sets, the MCS set #2 may correspond to one or more coefficients (denoted by a coefficient group #2-2 below for ease of understanding) in the N coefficients.

It should be noted that, in this embodiment of the present invention, the coefficient group #2-1 is different from the coefficient group #2-2. Specifically, there is at least one different coefficient in the coefficient group #2-1 and the coefficient group #2-2.

Preferably, in this embodiment of the present invention, M=N. In other words, the N coefficients included in the coefficient set # A may be in a one-to-one correspondence with the M MCS sets.

Therefore, as described above, in this embodiment of the present invention, there may be a mapping relationship (denoted by a mapping relationship # B below for ease of understanding and differentiation) between the N coefficients included in the coefficient set # A and a plurality of (for example, N) MCS sets, and each MCS set may correspond to at least one coefficient.

A specific value in each MCS set (or a specific value of one or more MCSs included in each MCS set) may be set to any value.

For example, by way of example instead of limitation, because a TBS corresponding to a minimum MCS affects a coverage area of the network device or the terminal device, the M MCS sets may include an MCS set # M1, the MCS set # M1 includes at least the minimum MCS, and a coefficient corresponding to the MCS set # M1 does not include a largest coefficient in the N coefficients. In this way, a relatively small coefficient is used for the minimum MCS, so that a code rate of a transport block corresponding to the minimum MCS can be reduced, to support a larger coverage area.

For example, by way of example instead of limitation, because a TBS corresponding to a maximum MCS affects a peak transmission rate of the network device or the terminal device, the M MCS sets may include an MCS set # M2, the MCS set # M2 includes at least the maximum MCS, and a coefficient corresponding to the MCS set # M2 does not include a largest coefficient in the N coefficients. In this way, because a code rate corresponding to a maximum MCS obtained using the largest coefficient in the N coefficients may exceed 0.93 or 0.931, the largest coefficient in the N coefficients is not selected, so that a valid maximum MCS obtained using the coefficient corresponding to the MCS set # M2 can increase a system peak rate.

For example, by way of example instead of limitation, because a relatively high code rate corresponding to an MCS corresponding to a modulation order switching location affects transmission reliability and spectral efficiency, the M MCS sets may include an MCS set # M3, the MCS set # M3 includes at least the MCS corresponding to the modulation order switching location, and a coefficient corresponding to the MCS set # M3 does not include a largest coefficient in the N coefficients. In this way, a relatively small coefficient is used for the MCS corresponding to the modulation order switching location, so that a code rate of a transport block corresponding to the MCS corresponding to the modulation order switching location can be reduced, to improve transmission reliability and spectral efficiency.

For example, by way of example instead of limitation, the following Table 8 shows an example of the mapping relationship # B. It should be noted that, coefficients in Table 8 are examples, and may be set to any specific values based on an actual need.

TABLE 8

| MCS set | Coefficient |
| --- | --- |
| Minimum MCS | 1/11 |
| MCS other than the minimum MCS | 2/11 |

For another example, by way of example instead of limitation, the following Table 9 shows another example of the mapping relationship # B. It should be noted that, coefficients in Table 9 are examples, and may be set to any specific values based on an actual need.

TABLE 9

| MCS set | Coefficient |
| --- | --- |
| Maximum MCS corresponding to 64QAM and/or maximum MCS corresponding to 256QAM | 1/7 |
| MCS other than the maximum MCS corresponding to 64QAM and/or the maximum MCS corresponding to 256QAM | 2/11 |

For another example, by way of example instead of limitation, the following Table 10 shows another example of the mapping relationship # B. It should be noted that, coefficients in Table 10 are examples, and may be set to any specific values based on an actual need.

TABLE 10

| MCS set | Coefficient |
| --- | --- |
| Minimum MCS | 1/11 |
| Maximum MCS corresponding to 64QAM and/or maximum MCS corresponding to 256QAM | 1/7 |
| MCS other than the minimum MCS, and the maximum MCS corresponding to 64QAM and/or the maximum MCS corresponding to 256QAM | 2/11 |

For another example, by way of example instead of limitation, the following Table 11 shows another example of the mapping relationship # B. It should be noted that, coefficients in Table 11 are examples, and may be set to any specific values based on an actual need.

TABLE 11

| MCS set | Coefficient |
| --- | --- |
| Minimum MCS | 1/11 |
| Maximum MCS corresponding to 64QAM and/or maximum MCS corresponding to 256QAM | 1/7 |
| MCS corresponding to a modulation order switching location | 1/6 |
| MCS other than the minimum MCS, the maximum MCS corresponding to 64QAM and/or the maximum MCS corresponding to 256QAM, and the MCS corresponding to the modulation order switching location | 2/11 |

Therefore, the network device may determine, based on an MCS (namely, an example of a first MCS, which is denoted by an MCS # A below for ease of understanding and differentiation) used in the time-frequency resource # A and from a plurality of MCS sets corresponding to the coefficient set # A, an MCS set (namely, an example of a first MCS set, which is denoted by an MCS set # A below for ease of understanding and differentiation) to which the MCS # A belongs. Then the network device may determine, based on the MCS set # A and the mapping relationship # B, a coefficient corresponding to the MCS set # A as a coefficient (namely, a coefficient # A) used by the terminal device # A in the TTI # A.

By way of example instead of limitation, the terminal device # A may also determine the coefficient # A from the coefficient set # A based on the MCS set # A. Moreover, a specific method and process in which the terminal device # A determines the coefficient # A from the coefficient set # A based on the MCS set # A may be similar to the specific method and process in which the network device determines the coefficient # A from the coefficient set # A based on the MCS set # A. To avoid repetition, detailed descriptions are omitted herein.

The network device or the terminal device # A can flexibly select, as the first coefficient, a coefficient meeting a current use requirement of the TTI, thereby further improving the reliability and the accuracy of wireless communication.

It should be noted that, as described above, the MCS set # A may correspond to a plurality of coefficients. In this case, the following processing manner may be used:

For example, the network device may determine, according to a preset rule, the coefficient # A from the plurality of coefficients corresponding to the MCS set # A. By way of example instead of limitation, the network device may use a largest (or smallest) coefficient in the plurality of coefficients corresponding to the MCS set # A as the coefficient # A.

For another example, the plurality of coefficients corresponding to the MCS set # A may be in a one-to-one correspondence with a plurality of parameter groups, and the network device may determine, based on a parameter group currently used by (or corresponding to) the terminal device # A and from the plurality of coefficients corresponding to the MCS set # A, a coefficient corresponding to the parameter group currently used by (or corresponding to) the terminal device # A as the coefficient # A. By way of example instead of limitation, in this embodiment of the present invention, any one of the plurality of parameter groups may include at least one of the following parameters: overheads, a frequency domain resource quantity range, and CSI.

By way of example instead of limitation, in this embodiment of the present invention, the parameter set # A corresponding to the TTI # A may include a plurality of particular parameters, and the plurality of particular parameters may be in a one-to-one correspondence with a plurality of particular MCS values. The particular MCS values may include a minimum MCS that is specified in a communications system or a communications protocol and that can be used by the network device or the terminal device, or the particular MCS values may include a maximum MCS that is specified in a communications system or a communications protocol and that can be used by the network device or the terminal device, or the particular MCS values may include an MCS corresponding to a modulation order switching point.

Case γ

In this embodiment of the present invention, assuming that the coefficient set # A includes N coefficients, the N coefficients may correspond to P frequency domain resource quantity ranges.

In this embodiment of the present invention, one frequency domain resource quantity range may include one or more frequency domain resource quantity values, and an intersection between any two frequency domain resource quantity ranges may be an empty set.

In this embodiment of the present invention, each of the P frequency domain resource quantity ranges corresponds to at least one of the N coefficients.

It should be noted that, in this embodiment of the present invention, any two frequency domain resource quantity ranges may include a same quantity or different quantities of frequency domain resource quantity values. This is not particularly limited in this embodiment of the present invention.

Moreover, in this embodiment of the present invention, any two frequency domain resource quantity ranges may correspond to a same quantity or different quantities of coefficients. This is not particularly limited in this embodiment of the present invention.

Moreover, in this embodiment of the present invention, there is at least one different coefficient in coefficients corresponding to any two frequency domain resource quantity ranges.

Generally, for any frequency domain resource quantity range (denoted by a frequency domain resource quantity range #1 below for ease of understanding) in the P frequency domain resource quantity ranges, the frequency domain resource quantity range #1 may correspond to one or more coefficients (denoted by a coefficient group #3-1 below for ease of understanding) in the N coefficients.

In addition, for another frequency domain resource quantity range (denoted by a frequency domain resource quantity range #2 below for ease of understanding) in the P frequency domain resource quantity ranges, the frequency domain resource quantity range #2 may correspond to one or more coefficients (denoted by a coefficient group #3-2 below for ease of understanding) in the N coefficients.

It should be noted that, in this embodiment of the present invention, the coefficient group #3-1 is different from the coefficient group #3-2. Specifically, there is at least one different coefficient in the coefficient group #3-1 and the coefficient group #3-2.

Preferably, in this embodiment of the present invention, P=N. In other words, the N coefficients included in the coefficient set # A may be in a one-to-one correspondence with the P frequency domain resource quantity ranges.

Therefore, as described above, in this embodiment of the present invention, there may be a mapping relationship (denoted by a mapping relationship # C below for ease of understanding and differentiation) between the N coefficients included in the coefficient set # A and a plurality of (for example, N) frequency domain resource quantity ranges, and each frequency domain resource quantity range may correspond to at least one coefficient.

A specific value in each frequency domain resource quantity range (or a specific value of one or more frequency domain resource quantities included in each frequency domain resource quantity range) may be set to any value.

For example, by way of example instead of limitation, because a plurality of frequency domain resources (for example, a quantity of RBs) may be quantized into a same frequency domain resource, to ensure that more relatively small TBSs can be selected to adapt to transmission of different services, the P frequency domain resource quantity ranges may include a frequency domain resource quantity range # P1, the frequency domain resource quantity range # P1 includes at least a plurality of frequency domain resource including a minimum frequency domain resource, and a coefficient corresponding to the frequency domain resource quantity range # P1 does not include a largest coefficient in the N coefficients. In this way, a relatively small coefficient is used for the frequency domain resource quantity range # P1, so that more relatively small TBSs can be selected based on a frequency domain resource quantized using the coefficient, to adapt to transmission of different services.

For example, by way of example instead of limitation, because a plurality of frequency domain resource quantities (for example, a quantity of RBs) may be quantized into a same frequency domain resource, to ensure that a relatively large TBS can be selected to increase a peak rate, the P frequency domain resource quantity ranges may include a frequency domain resource quantity range # P2, the frequency domain resource quantity range # P2 includes at least a plurality of frequency domain resource quantities including a maximum frequency domain resource, and a coefficient corresponding to the frequency domain resource quantity range # P2 does not include a smallest coefficient in the N coefficients. In this way, a relatively large coefficient is used for the frequency domain resource quantity range # P2, so that a larger TBS can be selected based on a frequency domain resource quantized using the coefficient, to increase the peak rate.

For example, by way of example instead of limitation, the following Table 12 shows an example of the mapping relationship # C. It should be noted that, frequency domain resource quantity ranges and coefficients in Table 12 are examples, and may be set to any specific values based on an actual need.

TABLE 12

| Frequency domain resource quantity range z | Coefficient |
|---|---|
| 1 RB ≤ z ≤ 6 RBs | 1/7 |
| 7 RBs ≤ z ≤ 110 RBs | 1/6 |

For example, by way of example instead of limitation, the following Table 13 shows another example of the mapping relationship # C. It should be noted that, frequency domain resource quantity ranges and coefficients in Table 13 are examples, and may be set to any specific values based on an actual need.

TABLE 13

| Frequency domain resource quantity range z | Coefficient |
|---|---|
| 1 RB ≤ z ≤ 89 RBs | 1/6 |
| 90 RBs ≤ z ≤ 110 RBs | 2/11 |

Therefore, the network device may determine, based on a frequency domain resource quantity (denoted by a frequency domain resource quantity # A below for ease of understanding and differentiation) corresponding to the time-frequency resource # A and from a plurality of frequency domain resource quantity ranges corresponding to the coefficient set # A, a frequency domain resource quantity range (namely, an example of a first frequency domain resource quantity range, which is denoted by a frequency domain resource quantity range # A below for ease of understanding and differentiation) to which the frequency domain resource quantity # A belongs. Then the network device may determine, based on the frequency domain resource quantity range # A and the mapping relationship # C, a coefficient corresponding to the frequency domain resource quantity range # A as a coefficient (namely, a coefficient # A) used by the terminal device # A in the TTI # A.

By way of example instead of limitation, the terminal device # A may also determine the coefficient # A from the coefficient set # A based on the frequency domain resource quantity # A. Moreover, a specific method and process in which the terminal device # A determines the coefficient # A from the coefficient set # A based on the frequency domain resource quantity # A may be similar to the specific method and process in which the network device determines the coefficient # A from the coefficient set # A based on the frequency domain resource quantity # A. To avoid repetition, detailed descriptions are omitted herein.

The network device or the terminal device # A can flexibly select, as the first coefficient, a coefficient meeting a current use requirement of the TTI, thereby further improving the reliability and the accuracy of wireless communication.

It should be noted that, as described above, the frequency domain resource quantity range # A may correspond to a plurality of coefficients. In this case, the following processing manner may be used:

For example, the network device may determine, according to a preset rule, the coefficient # A from the plurality of coefficients corresponding to the frequency domain resource quantity range # A. By way of example instead of limitation, the network device may use a largest (or smallest) coefficient in the plurality of coefficients corresponding to the frequency domain resource quantity range # A as the coefficient # A.

For another example, the plurality of coefficients corresponding to the frequency domain resource quantity range # A may be in a one-to-one correspondence with a plurality of parameter groups, and the network device may determine, based on a parameter group currently used by (or corresponding to) the terminal device # A and from the plurality of coefficients corresponding to the frequency domain resource quantity range # A, a coefficient corresponding to the parameter group currently used by (or corresponding to) the terminal device # A as the coefficient # A. By way of example instead of limitation, in this embodiment of the present invention, any one of the plurality of parameter groups may include at least one of the following parameters: overheads, an MCS, and CSI.

Case η

In this embodiment of the present invention, assuming that the coefficient set # A includes N coefficients, the N coefficients may correspond to Q TBS sets, and Q≥1.

In this embodiment of the present invention, one TBS set may include one or more TBS values, and an intersection between any two TBS sets may be an empty set.

In this embodiment of the present invention, each of the Q TBS sets corresponds to at least one of the N coefficients.

It should be noted that, in this embodiment of the present invention, any two TBS sets may include a same quantity or different quantities of TBSs. This is not particularly limited in this embodiment of the present invention.

Moreover, in this embodiment of the present invention, any two TBS sets may correspond to a same quantity or different quantities of coefficients. This is not particularly limited in this embodiment of the present invention.

Moreover, in this embodiment of the present invention, there is at least one different coefficient in coefficients corresponding to any two TBS sets.

Generally, for any TBS set (denoted by a TBS set #1 below for ease of understanding) in the Q TBS sets, the TBS set #1 may correspond to one or more coefficients (denoted by a coefficient group #4-1 below for ease of understanding) in the N coefficients.

In addition, for another TBS set (denoted by a TBS set #2 below for ease of understanding) in the Q TBS sets, the TBS set #2 may correspond to one or more coefficients (denoted by a coefficient group #4-2 below for ease of understanding) in the N coefficients.

It should be noted that, in this embodiment of the present invention, the coefficient group #4-1 is different from the coefficient group #4-2. Specifically, there is at least one different coefficient in the coefficient group #4-1 and the coefficient group #4-2.

Preferably, in this embodiment of the present invention, Q=N. In other words, the N coefficients included in the coefficient set # A may be in a one-to-one correspondence with the Q TBS sets.

Therefore, as described above, in this embodiment of the present invention, there may be a mapping relationship (denoted by a mapping relationship # D below for ease of understanding and differentiation) between the N coefficients included in the coefficient set # A and a plurality of (for example, N) TBS sets, and each TBS set may correspond to at least one coefficient.

A specific value in each TBS set (or a specific value of one or more TBSs included in each TBS set) may be set to any value.

For example, by way of example instead of limitation, because in a candidate TBS set, a difference between any two adjacent TBSs is different from that between other two adjacent TBSs, to ensure that more relatively small TBSs can be selected to adapt to transmission of different services, the Q TBS sets may include a TBS set # Q1, the TBS set # Q1 includes at least a plurality of TBS values including a smallest TBS, and a coefficient corresponding to the TBS set # Q1 does not include a largest coefficient in the N coefficients. In this way, a relatively small coefficient is used for the TBS set # Q1, so that more relatively small TBSs can be selected after quantization is performed using the coefficient, to adapt to transmission of different services.

For example, by way of example instead of limitation, Table 14 shows the TBS candidate set.

TABLE 14

| | | | | | | | | | |
|---|---|---|---|---|---|---|---|---|---|
| 16 | 296 | 600 | 1096 | 1928 | 3240 | 6200 | 11832 | 22920 | 43816 |
| 24 | 328 | 616 | 1128 | 1992 | 3368 | 6456 | 12216 | 23688 | 45352 |
| 32 | 336 | 632 | 1160 | 2024 | 3496 | 6712 | 12576 | 24496 | 46888 |
| 40 | 344 | 648 | 1192 | 2088 | 3624 | 6968 | 12960 | 25456 | 48936 |
| 56 | 376 | 680 | 1224 | 2152 | 3752 | 7224 | 13536 | 26416 | 51024 |
| 72 | 392 | 696 | 1256 | 2216 | 3880 | 7480 | 14112 | 27376 | 52752 |
| 88 | 408 | 712 | 1288 | 2280 | 4008 | 7736 | 14688 | 28336 | 55056 |
| 104 | 424 | 744 | 1320 | 2344 | 4136 | 7992 | 15264 | 29296 | 57336 |
| 120 | 440 | 776 | 1352 | 2408 | 4264 | 8248 | 15840 | 30576 | 59256 |
| 136 | 456 | 808 | 1384 | 2472 | 4392 | 8504 | 16416 | 31704 | 61664 |
| 144 | 472 | 840 | 1416 | 2536 | 4584 | 8760 | 16992 | 32856 | 63776 |
| 152 | 488 | 872 | 1480 | 2600 | 4776 | 9144 | 17568 | 34008 | 66592 |
| 176 | 504 | 904 | 1544 | 2664 | 4968 | 9528 | 18336 | 35160 | 68808 |

TABLE 14-continued

| 208 | 520 | 936  | 1608 | 2728 | 5160 | 9912  | 19080 | 36696 | 71112 |
| 224 | 536 | 968  | 1672 | 2792 | 5352 | 10296 | 19848 | 37888 | 73712 |
| 256 | 552 | 1000 | 1736 | 2856 | 5544 | 10680 | 20616 | 39232 | 75376 |
| 280 | 568 | 1032 | 1800 | 2984 | 5736 | 11064 | 21384 | 40576 |       |
| 288 | 584 | 1064 | 1864 | 3112 | 5992 | 11448 | 22152 | 42368 |       |

For example, by way of example instead of limitation, the following Table 15 shows an example of the mapping relationship # D. It should be noted that, TBS sets obtained through division and coefficients in Table 15 are examples, and may be set to any specific values based on an actual need.

TABLE 15

| TBS set | Coefficient |
| --- | --- |
| TBS that is estimated based on the current system and that is less than or equal to 328 | 1/7 |
| TBS that is estimated based on the current system and that is greater than 328 | 1/6 |

Therefore, the network device may determine, based on the current system, a TBS (denoted by a TBS # A below for ease of understanding and differentiation) corresponding to the time-frequency resource # A.

Subsequently, the network device may determine, from a plurality of TBS sets corresponding to the coefficient set # A, a TBS set (denoted by a TBS set # A for ease of understanding and differentiation) to which the TBS # A belongs. Then the network device may determine, based on the TBS set # A and the mapping relationship # D, a coefficient corresponding to the TBS set # A as a coefficient (namely, a coefficient # A) used by the terminal device # A in the TTI # A.

By way of example instead of limitation, the terminal device # A may also determine the coefficient # A from the coefficient set # A based on the TBS set # A. Moreover, a specific method and process in which the terminal device # A determines the coefficient # A from the coefficient set # A based on the TBS set # A may be similar to the specific method and process in which the network device determines the coefficient # A from the coefficient set # A based on the TBS set # A. To avoid repetition, detailed descriptions are omitted herein.

The network device or the terminal device # A can flexibly select, as the first coefficient, a coefficient meeting a current use requirement of the TTI, thereby further improving the reliability and the accuracy of wireless communication.

It should be noted that, as described above, the TBS set # A may correspond to a plurality of coefficients. In this case, the following processing manner may be used:

For example, the network device may determine, according to a preset rule, the coefficient # A from the plurality of coefficients corresponding to the TBS set # A. By way of example instead of limitation, the network device may use, as the coefficient # A, a largest (or smallest) coefficient in the plurality of coefficients corresponding to the TBS set # A.

For another example, the plurality of coefficients corresponding to the TBS set # A may be in a one-to-one correspondence with a plurality of parameter groups, and the network device may determine, based on a parameter group currently used by (or corresponding to) the terminal device # A and from the plurality of coefficients corresponding to the TBS set # A, a coefficient corresponding to the parameter group currently used by (or corresponding to) the terminal device # A as the coefficient # A. By way of example instead of limitation, in this embodiment of the present invention, any one of the plurality of parameter groups may include at least one of the following parameters: overheads, an MCS, a frequency domain resource quantity range, and CSI.

It should be understood that, the above-enumerated methods and processes for determining the coefficient # A are merely examples for description, and this embodiment of the present invention is not limited thereto. For example, the methods described in the case $\alpha$ to the case $1_1$ may be separately used or used in combination. This is not particularly limited in this embodiment of the present invention. In other words, in this embodiment of the present invention, the network device may determine the coefficient # A based on one or more of the following parameters: the overheads in the time-frequency resource # A, the MCS on the time-frequency resource # A, the frequency domain resource quantity corresponding to the time-frequency resource # A, and the TBS that is on the time-frequency resource # A and that is determined based on the current system.

By way of example instead of limitation, in this embodiment of the present invention, after determining the coefficient # A, the network device may indicate the determined coefficient # A to the terminal device # A using signaling (namely, an example of first indication information).

In S220, the network device and the terminal device # A may determine a TBS (namely, an example of a first TBS, which is denoted by a TBS # A below for ease of understanding and differentiation) on the time-frequency resource # A based on the coefficient # A.

By way of example instead of limitation, for example, in this embodiment of the present invention, the network device and the terminal device # A may store a mapping relationship entry used to determine a TBS. Each TBS value in the entry may correspond to indexes in two dimensions, an index in one dimension may be an RB value, and an index in the other dimension may be an MCS. Therefore, the network device and the terminal device # A may quantize, based on the determined coefficient # A, the frequency domain resource quantity (for example, an RB quantity) corresponding to the time-frequency resource # A, to obtain an RB value (denoted by an RB value # A). Moreover, the network device and the terminal device # A may determine the MCS (namely, the MCS # A) corresponding to the time-frequency resource # A. In this way, the network device and the terminal device # A may determine, from the mapping relationship entry, a TBS corresponding to the RB value # A and the MCS # A as the TBS # A.

By way of example instead of limitation, for example, in this embodiment of the present invention, the network device and the terminal device # A may store a mapping relationship entry used to determine a TBS. Each TBS value in the entry may correspond to indexes in two dimensions, an index in one dimension may be an RB value, and an index in the other dimension may be an MCS. Therefore, the network device and the terminal device # A may determine the frequency domain resource quantity (for example, an RB quantity, which is denoted by an RB value # A) corresponding to the time-frequency resource # A. Moreover, the network device and the terminal device # A may determine the MCS (namely, the MCS # A) corresponding to the time-frequency resource # A. In this way, the network device and the terminal device # A may determine, from the mapping relationship entry, a TBS corresponding to the RB value # A and the MCS # A as a TBS # A1. Finally, the network device and the terminal device # A may quantize the TBS # A1 based on the determined coefficient # A to obtain a TBS and use the TBS as the TBS # A.

By way of example instead of limitation, for example, in this embodiment of the present invention, the network device and the terminal device # A may obtain a coefficient # C based on the determined coefficient # A and a preset fixed quantization coefficient # B. For example, Coefficient # C=(Coefficient # A*Coefficient # B), or Coefficient # C=(Coefficient # A+Coefficient # B). The network device and the terminal device # A may store a mapping relationship entry used to determine a TBS. Each TBS value in the entry may correspond to indexes in two dimensions, an index in one dimension may be an RB value, and an index in the other dimension may be an MCS. Therefore, the network device and the terminal device # A may quantize, based on the determined coefficient # C, the frequency domain resource quantity (for example, an RB quantity) corresponding to the time-frequency resource # A, to obtain an RB value (denoted by an RB value # A). Moreover, the network device and the terminal device # A may determine the MCS (namely, the MCS # A) corresponding to the time-frequency resource # A. In this way, the network device and the terminal device # A may determine, from the mapping relationship entry, a TBS corresponding to the RB value # A and the MCS # A as the TBS # A.

By way of example instead of limitation, for example, in this embodiment of the present invention, the network device and the terminal device # A may obtain a coefficient # C based on the determined coefficient # A and a preset fixed quantization coefficient # B. For example, Coefficient # C=(Coefficient # A*Coefficient # B), or Coefficient # C=(Coefficient # A+Coefficient # B). The network device and the terminal device # A may store a mapping relationship entry used to determine a TBS. Each TBS value in the entry may correspond to indexes in two dimensions, an index in one dimension may be an RB value, and an index in the other dimension may be an MCS. Therefore, the network device and the terminal device # A may quantize, based on the determined coefficient # A, the frequency domain resource quantity (for example, an RB quantity, which is denoted by an RB value # A) corresponding to the time-frequency resource # A. Moreover, the network device and the terminal device # A may determine the MCS (namely, the MCS # A) corresponding to the time-frequency resource # A. In this way, the network device and the terminal device # A may determine, from the mapping relationship entry, a TBS corresponding to the RB value # A and the MCS # A as a TBS # A1. Finally, the network device and the terminal device # A may quantize the TBS # A1 based on the determined coefficient # C to obtain a TBS and use the TBS as the TBS # A.

It should be understood that, the above-enumerated methods and processes for determining the TBS # A based on the coefficient # A are merely examples for description, and this embodiment of the present invention is not limited thereto. A method and process may alternatively be similar to another method and process in the current system that can be used to determine a TBS based on a quantization coefficient. To avoid repetition, detailed descriptions are omitted herein.

In S230, the network device and the terminal device # A may perform data transmission based on the TBS # A. A process may be similar to that in the current system. To avoid repetition, detailed descriptions are omitted herein.

According to the wireless communication method in this embodiment of the present invention, for one TTI, two or more coefficients used to determine a TBS for uplink transmission corresponding to the TTI or a TBS for downlink transmission corresponding to the TTI are configured, so that a proper coefficient can be selected based on current use of the TTI to determine the TBS, and the determined TBS can correspond to a current communication status, thereby improving reliability and accuracy of wireless communication.

In data transmission corresponding to a short TTI (whose TTI length is less than 1 ms), a largest TBS that can be supported is smaller. If a soft buffer upper limit value corresponding to a 1 ms TTI is still used as an encoding assumption, for transmission based on all TBSs corresponding to this short TTI, soft bits may be buffered based on redundancy with a code rate of 1/3. However, for a relatively large TBS corresponding to a high-order MCS, for example, a peak TBS, transmission is usually performed at a high signal-to-noise ratio, and a probability of incorrect decoding is relatively low. In this case, a soft buffer upper limit value is designed for the 1 ms TTI based on a code rate of 2/3; for the short TTI, if a soft buffer upper limit value is designed still based on redundancy with the code rate of 1/3, a soft buffer waste is caused.

Figure 9:
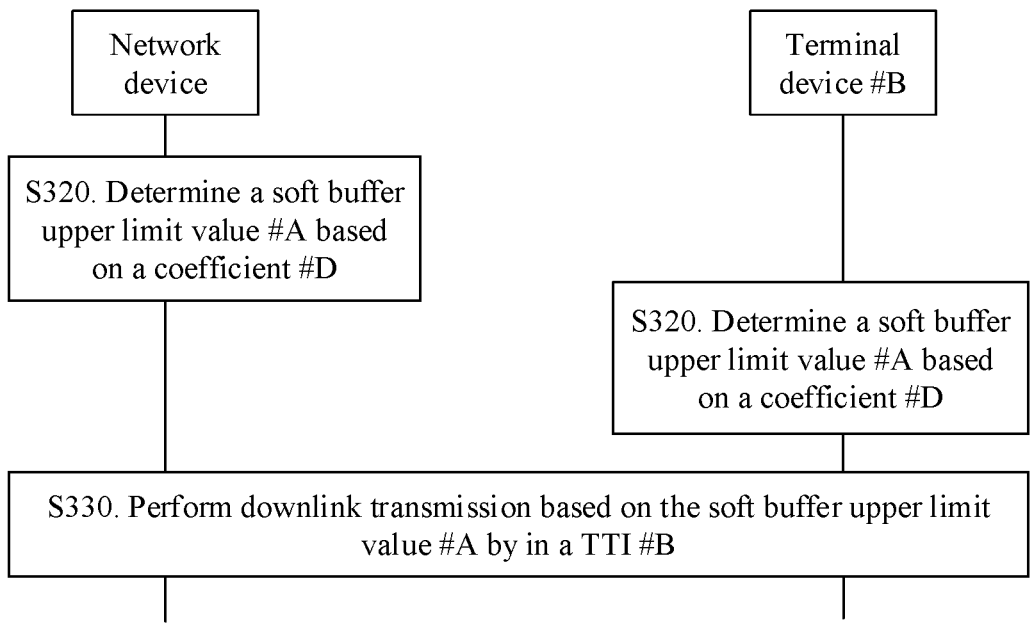
FIG. 9 is a schematic interaction diagram of another example of a wireless communication method according to an embodiment of the present invention.

A specific process of a wireless communication method 300 in an embodiment of the present invention is described in detail below with reference to FIG. 9. FIG. 9 is a schematic interaction diagram of the wireless communication method 300 according to this embodiment of the present invention.

As shown in FIG. 9, in S310, a network device and a terminal device # B (namely, an example of a terminal device) may determine a coefficient (denoted by a coefficient # D below for ease of understanding and differentiation) that corresponds to a TTI # B and that is used to determine a soft buffer upper limit value.

By way of example instead of limitation, in this embodiment of the present invention, the TTI # B may be a TTI that includes less than or equal to 7 symbols. For example, a quantity of symbols included in the TTI # B may be any value in {1, 2, 3, 4, 5, 6, 7}.

By way of example instead of limitation, in this embodiment of the present invention, the coefficient # D corresponding to the TTI # B may be determined based on the quantity of symbols included in the TTI # B. For example, the coefficient # D corresponding to the TTI # B may be determined based on a ratio of the quantity of symbols included in the TTI # B to a quantity of valid data symbols included in a 1 ms TTI. For example, the TTI # B includes two symbols, the 1 ms TTI includes 12 valid data symbols, and the coefficient # D may be 1/6.

By way of example instead of limitation, in this embodiment of the present invention, the coefficient # D corresponding to the TTI # B may be determined based on a TTI structure of a subframe (denoted by a subframe # B below for ease of understanding and differentiation) to which the TTI # B belongs. For example, the coefficient # D corresponding to the TTI # B may be determined based on a ratio of a maximum quantity of symbols included in a TTI of the subframe # B to a quantity of valid data symbols included in a 1 ms TTI. For example, the TTI structure corresponding to the subframe # B is shown in FIG. 2, the maximum quantity of symbols included in the TTI of the subframe # B is 3, the 1 ms TTI includes 12 valid data symbols, and the coefficient # D may be 1/4.

By way of example instead of limitation, in this embodiment of the present invention, the coefficient # D corresponding to the TTI # B may be determined based on a soft buffer corresponding to a largest TBS that can be used for transmission in the TTI # B. For example, the coefficient # D corresponding to the TTI # B may be determined based on a ratio of the soft buffer corresponding to the largest TBS that can be used for transmission in the TTI # B to a soft buffer corresponding to a maximum TBS that can be used for transmission in a 1 ms TTI. For example, if the TTI # B includes two symbols, the largest TBS that can be used for transmission is 13536, the corresponding soft buffer is 20592, the maximum TBS that can be used for transmission in the 1 ms TTI is 75376, and the corresponding soft buffer is 114192, the coefficient # D may be (20592/114192), which is approximately 1/5.

With reference to the descriptions in the method 200, by way of example instead of limitation, in this embodiment of the present invention, the coefficient # D corresponding to the TTI # B may be determined based on a coefficient set (namely, another example of the first coefficient set, which is denoted by a coefficient set # B below for ease of understanding and differentiation) corresponding to the TTI # B. For example, the coefficient # D corresponding to the TTI # B may be a largest (or smallest) coefficient included in the coefficient set # B.

In S320, the network device and the terminal device # B may determine, based on the coefficient # D, a soft buffer upper limit value (denoted by a soft buffer limit value # A below for ease of understanding and differentiation) corresponding to the TTI # B.

By way of example instead of limitation, for example, in this embodiment of the present invention, the network device and the terminal device # B may determine a soft buffer upper limit value (denoted by a soft buffer upper limit value # B below for ease of understanding and differentiation) corresponding to transmission in the 1 ms TTI, and then the network device and the terminal device # B may quantize, based on the determined coefficient # D, the soft buffer upper limit value # B or a parameter used for determining the soft buffer upper limit value # B, to obtain the soft buffer upper limit value # A.

For example, by way of example instead of limitation, in this embodiment of the present invention, the soft buffer upper limit value # B may be obtained using the following formula:

$$N_{\#B} = \left\lfloor \frac{N_{soft}}{K_C \cdot K_{MIMO} \cdot \min(M_{DL\_HARQ}, M_{limit})} \right\rfloor.$$

$N_{soft}$ is a total soft buffer value. $K_c$ is a fixed value related to the total soft buffer value and a maximum quantity of supported layers. $M_{DL\_HARQ}$ is a maximum quantity of downlink HARQ processes. $M_{limit}$ is a constant whose value is 8. $K_{MIMO}$ is related to a transmission mode, and a value of $K_{MIMO}$ is 2 in transmission modes 3, 4, 8, 9, and 10, and is 1 in another transmission mode.

Assuming that the determined coefficient # D is k, and k is a positive number less than 1, the soft buffer upper limit value # A may be obtained using the following formula:

$$N_{\#A} = \left\lfloor \frac{k \cdot N_{soft}}{K_C \cdot K_{MIMO} \cdot \min(M_{DL\_HARQ}, M_{limit})} \right\rfloor,$$

or $$N_{\#A} = \lceil k \cdot N_{\#B} \rceil.$$

For another example, by way of example instead of limitation, in this embodiment of the present invention, the soft buffer upper limit value # B may be obtained using the following formulas:

$$N_{\#B} = \left\lfloor \frac{N_{IR}}{C} \right\rfloor \text{ and } N_{IR} = \left\lfloor \frac{N_{soft}}{K_C \cdot K_{MIMO} \cdot \min(M_{DL\_HARQ}, M_{limit})} \right\rfloor.$$

C is a quantity of code blocks into which a transport block can be segmented. $N_{soft}$ is a total soft buffer value. $K_c$ is a fixed value related to the total soft buffer value and a maximum quantity of supported layers. $M_{DL\_HARQ}$ is a maximum quantity of downlink HARQ processes. $M_{limit}$ is a constant whose value is 8. $K_{MIMO}$ is related to a transmission mode, and a value of $K_{MIMO}$ is 2 in transmission modes 3, 4, 8, 9, and 10, and is 1 in another transmission mode.

Assuming that the determined coefficient # D is k, and k is a positive number less than 1, the soft buffer upper limit value # A may be obtained using the following formulas:

$$N_{\#A} = \left\lfloor \frac{k \cdot N_{IR}}{C} \right\rfloor$$

and $$N_{IR} = \left\lfloor \frac{N_{soft}}{K_C \cdot K_{MIMO} \cdot \min(M_{DL\_HARQ}, M_{limit})} \right\rfloor,$$

or $$N_{\#A} = \left\lceil k \cdot \left\lfloor \frac{N_{IR}}{C} \right\rfloor \right\rceil$$

and $$N_{IR} = \left\lfloor \frac{N_{soft}}{K_C \cdot K_{MIMO} \cdot \min(M_{DL\_HARQ}, M_{limit})} \right\rfloor.$$

For another example, by way of example instead of limitation, in this embodiment of the present invention, the soft buffer upper limit value # B may be obtained using the following formula:

$$N_{\#B} = \left\lfloor \frac{N_{soft}}{K_C \cdot K_{MIMO} \cdot \min(M_{DL\_HARQ}, M_{limit})} \right\rfloor.$$

$N_{soft}$ is a total soft buffer value. $K_c$ is a fixed value related to the total soft buffer value and a maximum quantity of supported layers. $M_{DL\_HARQ}$ is a maximum quantity of downlink HARQ processes. $M_{limit}$ is a constant whose value is 8. $K_{MIMO}$ is related to a transmission mode, and a value of $K_{MIMO}$ is 2 in transmission modes 3, 4, 8, 9, and 10, and is 1 in another transmission mode.

Assuming that the determined coefficient # D is k, and k is a positive number less than 1, the soft buffer upper limit value # A may be obtained using the following formula:

$$N_{\#A} = \left\lfloor \frac{N_{soft}}{K_C \cdot K_{MIMO} \cdot \min(M_{DL\_HARQ}, M_{limit\_\#A})} \right\rfloor.$$

$M_{limit\_\#A}$ is a preset constant, and $M_{limit\_\#A} = \lfloor 8/k \rfloor$.

It should be understood that, the above-enumerated methods and processes for determining the soft buffer upper limit value # A based on the coefficient # D are merely examples for description, and this embodiment of the present invention is not limited thereto. A method and process may alternatively be similar to another method and process in the current system that can be used to determine a soft buffer upper limit value based on a quantization coefficient. To avoid repetition, detailed descriptions are omitted herein.

In S330, the network device and the terminal device # B may perform downlink data communication based on the soft buffer upper limit value # A in the TTI # B. A process may be similar to that in the current system. To avoid repetition, detailed descriptions are omitted herein.

According to the wireless communication method in this embodiment of the present invention, for a TTI whose transmission time length is less than 1 ms, a soft buffer upper limit value that matches the TTI is set, so that when data transmission is performed in the TTI using a relatively large TBS corresponding to a high-order MCS, for example, peak TBS soft buffer overheads can be reduced.

Figure 10:
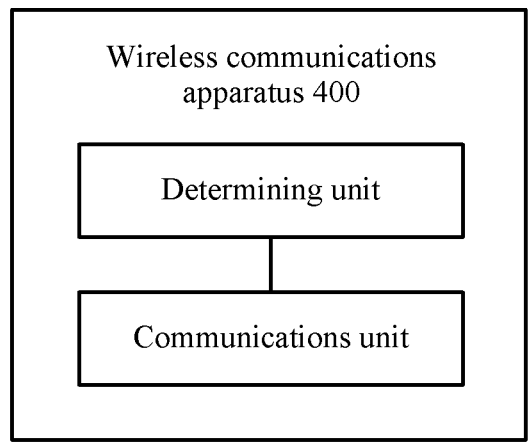
FIG. 10 is a schematic block diagram of an example of a wireless communications apparatus according to an embodiment of the present invention.

FIG. 10 is a schematic block diagram of a wireless communications apparatus 400 according to an embodiment of the present invention. The wireless communications apparatus 400 may correspond to (for example, may be configured in or may be) the terminal device (for example, the terminal device # A) described in the method 200. Moreover, modules or units in the wireless communications apparatus 400 are respectively configured to perform actions or processing processes performed by the terminal device (for example, the terminal device # A) in the method 200. To avoid repetition, detailed descriptions are omitted herein.

In this embodiment of the present invention, the apparatus 400 may include a processor and a transceiver, and the processor is connected to the transceiver. Optionally, the apparatus further includes a memory, and the memory is connected to the processor. Further optionally, the apparatus includes a bus system. The processor, the memory, and the transceiver may be connected using the bus system. The memory may be configured to store an instruction. The processor is configured to execute the instruction stored in the memory, to control the transceiver to send information or a signal.

A determining unit in the apparatus 400 shown in FIG. 10 may correspond to the processor, and a communications unit in the apparatus 400 shown in FIG. 10 may correspond to the transceiver.

Figure 11:
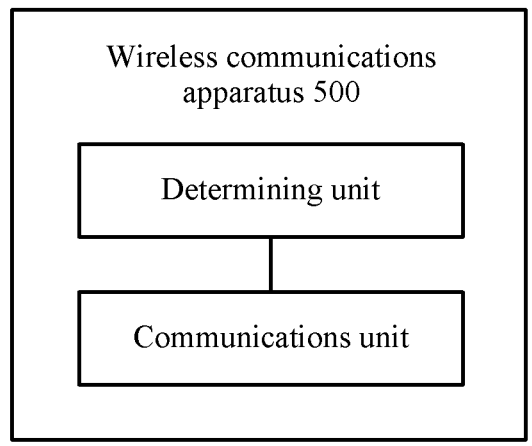
FIG. 11 is a schematic block diagram of another example of a wireless communications apparatus according to an embodiment of the present invention.

FIG. 11 is a schematic block diagram of a wireless communications apparatus 500 according to an embodiment of the present invention. The wireless communications apparatus 500 may correspond to (for example, may be configured in or may be) the network device described in the method 200. Moreover, modules or units in the wireless communications apparatus 500 are respectively configured to perform actions or processing processes performed by the network device in the method 200. To avoid repetition, detailed descriptions are omitted herein.

In this embodiment of the present invention, the apparatus 500 may include a processor and a transceiver, and the processor is connected to the transceiver. Optionally, the device further includes a memory, and the memory is connected to the processor. Further optionally, the device includes a bus system. The processor, the memory, and the transceiver may be connected using the bus system. The memory may be configured to store an instruction. The processor is configured to execute the instruction stored in the memory, to control the transceiver to send information or a signal.

A determining unit in the apparatus 500 shown in FIG. 11 may correspond to the processor, and a communications unit in the apparatus 500 shown in FIG. 11 may correspond to the transceiver.

Figure 12:
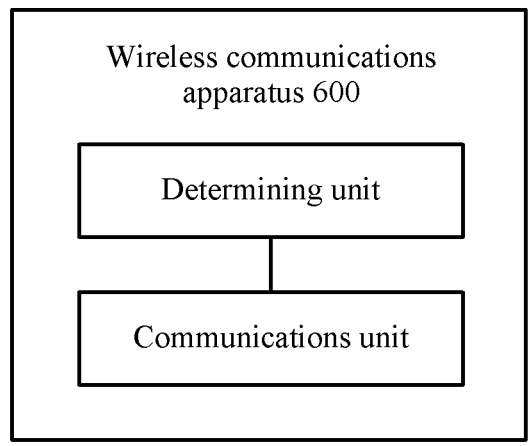
FIG. 12 is a schematic block diagram of still another example of a wireless communications apparatus according to an embodiment of the present invention.

FIG. 12 is a schematic block diagram of a wireless communications apparatus 600 according to an embodiment of the present invention. The wireless communications apparatus 600 may correspond to (for example, may be configured in or may be) the terminal device (for example, the terminal device # B) described in the method 300. Moreover, modules or units in the wireless communications apparatus 600 are respectively configured to perform actions or processing processes performed by the terminal device (for example, the terminal device # B) in the method 300. To avoid repetition, detailed descriptions are omitted herein.

In this embodiment of the present invention, the apparatus 600 may include a processor and a transceiver, and the processor is connected to the transceiver. Optionally, the device further includes a memory, and the memory is connected to the processor. Further optionally, the device includes a bus system. The processor, the memory, and the transceiver may be connected using the bus system. The memory may be configured to store an instruction. The processor is configured to execute the instruction stored in the memory, to control the transceiver to send information or a signal.

A determining unit in the apparatus 600 shown in FIG. 12 may correspond to the processor, and a communications unit in the apparatus 600 shown in FIG. 12 may correspond to the transceiver.

Figure 13:
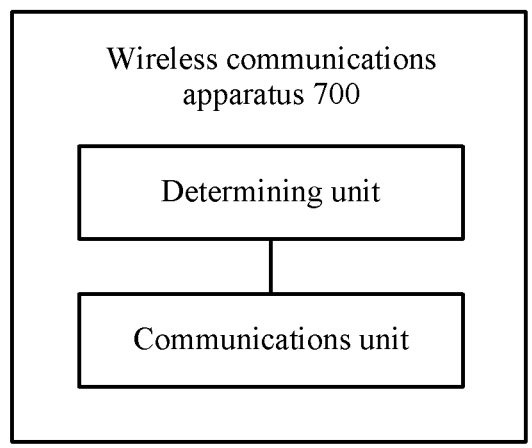
FIG. 13 is a schematic block diagram of still another example of a wireless communications apparatus according to an embodiment of the present invention.

FIG. 13 is a schematic block diagram of a wireless communications apparatus 700 according to an embodiment of the present invention. The wireless communications apparatus 700 may correspond to (for example, may be configured in or may be) the network device described in the method 300. Moreover, modules or units in the wireless communications apparatus 700 are respectively configured to perform actions or processing processes performed by the network device in the method 300. To avoid repetition, detailed descriptions are omitted herein.

In this embodiment of the present invention, the apparatus 700 may include a processor and a transceiver, and the processor is connected to the transceiver. Optionally, the device further includes a memory, and the memory is connected to the processor. Further optionally, the device includes a bus system. The processor, the memory, and the transceiver may be connected using the bus system. The memory may be configured to store an instruction. The processor is configured to execute the instruction stored in the memory, to control the transceiver to send information or a signal.

A determining unit in the apparatus 700 shown in FIG. 13 may correspond to the processor, and a communications unit in the apparatus 700 shown in FIG. 13 may correspond to the transceiver.

It should be noted that, the foregoing method embodiments in the embodiments of the present invention may be applied to a processor, or implemented by a processor. The processor may be an integrated circuit chip and has a signal processing capability. In an implementation process, steps in the foregoing method embodiments can be implemented using a hardware integrated logical circuit in the processor, or using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly performed and accomplished by a hardware decoding processor, or may be performed and accomplished using a combination of hardware in the decoding processor and a software module. The software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that, the memory in the embodiments of the present invention may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that, the memory of the systems and methods described in this specification includes, but is not limited to, these and any memory of another proper type.

It should be noted that, in the embodiments of the present invention, the terminal device # A and the terminal device # B may be a same terminal device, or may be different terminal devices. This is not particularly limited in the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, sequence numbers of the foregoing processes do not mean particular execution sequences. The execution sequences of the processes should be determined based on functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of the present invention essentially, or the part contributing to the current system, or some of the technical solutions may be implemented in a form of a software product. The computer software product is stored in a storage medium, and includes instructions for instructing a computer device (which may be a personal computer, a server, a network device, or the like) to perform all or some steps of the methods described in the embodiments of the present invention. The foregoing storage medium includes various media that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A wireless communication method comprising:
   determining, by a terminal, a coefficient k associated with a transmission time interval (TTI), wherein a quantity of symbols in the TTI is less than or equal to 7;
   determining, by the terminal, a soft buffer upper limit value $N_{\#\_A}$ associated with the TTI according to the coefficient k; and
   performing, by the terminal, downlink data communication based on the soft buffer upper limit $N_{\#\_A}$ in the TTI,
   wherein the coefficient k is determined based on the quantity of symbols included in the TTI, and the soft buffer upper limit value $N_{\#\_A}$ meets the following formula:

$$N_{\#A} = \left\lfloor \frac{k \cdot N_{soft}}{K_C \cdot K_{MIMO} \cdot \min(M_{DL\_HARQ}, M_{limit})} \right\rfloor,$$

wherein
$N_{soft}$ is a total soft buffer value, $K_C$ is a fixed value related to the total soft buffer value and a maximum quantity of supported layers, $M_{DL\_HARQ}$ is a maximum quantity of downlink hybrid automatic repeat request (HARQ) processes, $M_{limit}$ is a constant whose value is 8, and $K_{MIMO}$ is 1 or 2, and k is a positive number less than 1.

2. The method according to claim 1, wherein the TTI consists of 2 symbols and the coefficient is 1/6.

3. An apparatus comprising:
   at least one processor configured to
   determine a coefficient k associated with a transmission time interval (TTI), wherein a quantity of symbols in the TTI is less than or equal to 7, and
   determine a soft buffer upper limit value $N_{\#\_A}$ associated with the TTI according to the coefficient k; and
   a transceiver configured to cooperate with the at least one processor to perform downlink data communication based on the soft buffer upper limit $N_{\#\_A}$ in the TTI,
   wherein the coefficient k is determined based on the quantity of symbols included in the TTI, and the soft buffer upper limit value $N_{\#\_A}$ meets the following formula:

$$N_{\#A} = \left\lfloor \frac{k \cdot N_{soft}}{K_C \cdot K_{MIMO} \cdot \min(M_{DL\_HARQ}, M_{limit})} \right\rfloor,$$

wherein,
$N_{soft}$ is a total soft buffer value, $K_C$ is a fixed value related to the total soft buffer value and a maximum quantity of supported layers, $M_{DL\_HARQ}$ is a maximum quantity of downlink hybrid automatic repeat request (HARQ) processes, $M_{limit}$ is a constant whose value is 8, and $K_{MIMO}$ is 1 or 2, and k is a positive number less than 1.

4. The apparatus according to claim 3, wherein the TTI consists of 2 symbols and the coefficient is 1/6.

5. The apparatus according to claim 3, wherein the apparatus is a terminal device.

6. The apparatus according to claim 3, wherein the apparatus is a network device.

7. A non-transitory computer readable storage medium comprising processor-executable instructions, which when executed by a processor of a computer, cause the computer to implement:
   determining a coefficient k associated with a transmission time interval (TTI), wherein a quantity of symbols in the TTI is less than or equal to 7;
   determining a soft buffer upper limit value $N_{\#\_A}$ associated with the TTI according to the coefficient k; and
   performing downlink data communication based on the soft buffer upper limit $N_{\#\_A}$ in the TTI,
   wherein the coefficient k is determined based on the quantity of symbols included in the TTI, and the soft buffer upper limit value N # A meets the following formula:

$$N_{\#A} = \left\lfloor \frac{k \cdot N_{soft}}{K_C \cdot K_{MIMO} \cdot \min(M_{DL\_HARQ}, M_{limit})} \right\rfloor,$$

wherein
$N_{soft}$ is a total soft buffer value, $K_C$ is a fixed value related to the total soft buffer value and a maximum quantity of supported layers, $M_{DL\_HARQ}$ is a maximum quantity of downlink hybrid automatic repeat request (HARQ) processes, $M_{limit}$ is a constant whose value is 8, and $K_{MIMO}$ is 1 or 2, and k is a positive number less than 1.

8. The non-transitory computer readable storage medium according to claim 7, wherein the TTI consists of 2 symbols and the coefficient is ⅙.

* * * * *